United States Patent
Takigawa et al.

(10) Patent No.: US 12,027,988 B2
(45) Date of Patent: Jul. 2, 2024

(54) POWER CONVERSION APPARATUS, REFRIGERATION CYCLE APPARATUS, AND AIR CONDITIONER

(71) Applicant: Mitsubishi Electric Corporation, Tokyo (JP)

(72) Inventors: Yohei Takigawa, Tokyo (JP); Keiichiro Shizu, Tokyo (JP); Tomohiro Kutsuki, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 162 days.

(21) Appl. No.: 17/801,926

(22) PCT Filed: Mar. 19, 2020

(86) PCT No.: PCT/JP2020/012497
§ 371 (c)(1),
(2) Date: Aug. 24, 2022

(87) PCT Pub. No.: WO2021/186722
PCT Pub. Date: Sep. 23, 2021

(65) Prior Publication Data
US 2023/0090386 A1    Mar. 23, 2023

(51) Int. Cl.
*H02M 5/458*  (2006.01)
*F24F 11/88*  (2018.01)
*H02P 27/06*  (2006.01)

(52) U.S. Cl.
CPC ........... *H02M 5/4585* (2013.01); *F24F 11/88* (2018.01); *H02P 27/06* (2013.01)

(58) Field of Classification Search
CPC .. H02M 5/4585; H02M 1/0048; H02M 1/007; H02M 1/4225; H02M 1/4233;
(Continued)

(56) References Cited

U.S. PATENT DOCUMENTS 8,823,303 B2 * 9/2014 Shinomoto ......... H02M 7/2176
318/400.29

FOREIGN PATENT DOCUMENTS

JP    2000-014193 A    1/2000
JP    5058272 B2    10/2012
(Continued)

OTHER PUBLICATIONS

International Search Report of the International Searching Authority mailed Jun. 30, 2020 in corresponding International Application No. PCT/JP2020/012497 (and English translation).

*Primary Examiner* — David Luo
(74) *Attorney, Agent, or Firm* — Posz Law Group, PLC

(57) ABSTRACT

A power conversion apparatus includes: a reactor; a rectifier circuit that includes a first leg including switching elements connected in series and a second leg connected in parallel with the first leg, including switching elements connected in series; and a smoothing capacitor that smooths an output voltage of the rectifier circuit. The power conversion apparatus also includes an inverter that converts a direct-current voltage smoothed by the smoothing capacitor into a drive voltage for a motor and applies the drive voltage to the motor; a voltage detection unit that detects the direct-current voltage; and a control unit that controls operation of the rectifier circuit and the inverter. The control unit controls operations of the switching elements on the basis of an induced voltage induced in the motor and a detected value of the direct-current voltage.

12 Claims, 16 Drawing Sheets

(58) Field of Classification Search
CPC ......... H02M 7/219; F24F 11/88; H02P 27/06; Y02B 70/10
USPC ................................................ 318/504, 494
See application file for complete search history.

(56) References Cited

FOREIGN PATENT DOCUMENTS

| | | |
|---|---|---|
| JP | 2018-007326 A | 1/2018 |
| JP | 2018-007327 A | 1/2018 |
| JP | 2019-126217 A | 7/2019 |
| WO | 2017/134794 A1 | 8/2017 |

\* cited by examiner

POWER CONVERSION APPARATUS, REFRIGERATION CYCLE APPARATUS, AND AIR CONDITIONER

CROSS REFERENCE TO RELATED APPLICATION

This application is a U.S. National Stage Application of International Patent No. PCT/JP2020/012497 filed on Mar. 19, 2020, the disclosure of which is incorporated herein by reference.

TECHNICAL FIELD

The present disclosure relates to a power conversion apparatus that includes a diode bridgeless (DBL) rectifier circuit, a refrigeration cycle apparatus that includes the power conversion apparatus, and an air conditioner equipped with the refrigeration cycle apparatus.

BACKGROUND

A conventional technique that relates to a power conversion apparatus including a DBL rectifier circuit is described in Patent Literature 1 listed below. In Patent Literature 1, there is disclosed a technique of performing synchronous rectification in which a switching element connected to a positive electrode of a smoothing capacitor is set in an ON state for at least part of a period during which an electric current flows in a bridge circuit and switching elements not included in a current path are kept in an OFF state. There is a description that highly efficient power conversion can be realized by this technique.

PATENT LITERATURE

Patent Literature 1: Japanese Patent Application Laid-open No. 2018-7326

However, the synchronous rectification described in the above-listed Patent Literature 1 takes no account of an influence of a motor induced voltage on efficiency when a load is a motor. In a higher speed rotation range in which the motor rotates at a higher speed, the motor induced voltage and a motor current increase, thereby affecting the efficiency. Therefore, there is room for improvement of efficiency in the higher speed rotation range of the motor.

SUMMARY

The present disclosure has been made in view of the above circumstances, and an object thereof is to provide a power conversion apparatus that is capable of furthering efficiency improvement in a higher speed rotation range of a motor.

In order to solve the above-stated problem and achieve the object, the present disclosure provides a power conversion apparatus comprising: a reactor; a rectifier circuit to receive a power supply voltage outputted by an alternating-current power supply, the rectifier circuit including a first leg and a second leg connected in parallel with the first leg, the first leg including a first upper-arm element and a first lower-arm element that are connected in series, the second leg including a second upper-arm element and a second lower-arm element that are connected in series, the power supply voltage being applied, via the reactor, between a connection point between the first upper-arm element and the first lower-arm element and a connection point between the second upper-arm element and the second lower-arm element; a smoothing capacitor to smooth an output voltage of the rectifier circuit; an inverter to convert a direct-current voltage smoothed by the smoothing capacitor into a drive voltage for a motor and apply the drive voltage to the motor; a first voltage detection unit to detect the direct-current voltage; and a control unit to control operation of the rectifier circuit and the inverter, wherein the control unit controls operations of the first upper-arm element and the first lower-arm element on the basis of an induced voltage induced in the motor and a detected value of the direct-current voltage.

The power conversion apparatus according to the present disclosure has an advantageous effect that it can further efficiency improvement in a higher speed rotation range of the motor.

DETAILED DESCRIPTION

First Embodiment

Figure 1:
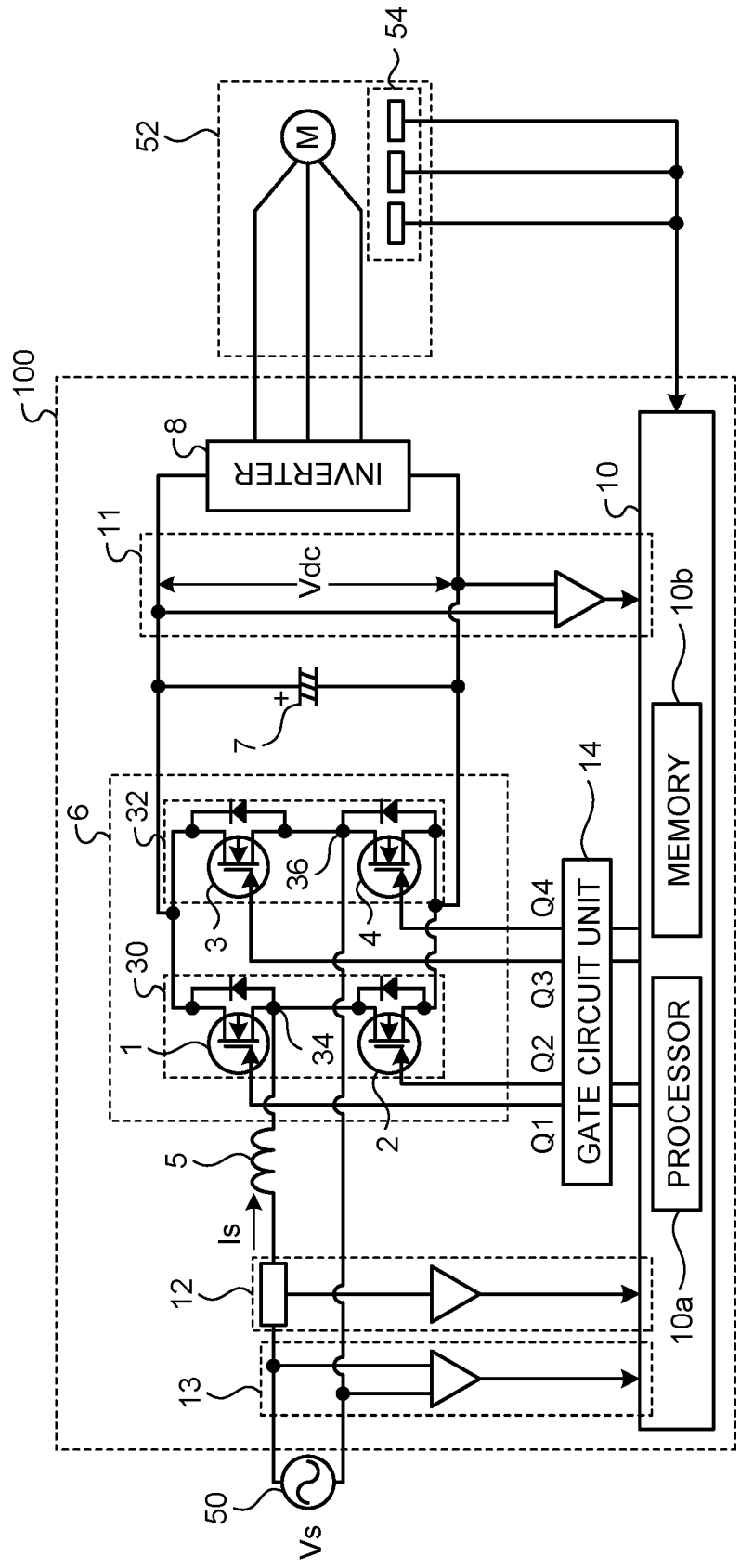
FIG. 1 is a diagram illustrating a configuration example of a power conversion apparatus according to a first embodiment.

FIG. 1 is a diagram illustrating a configuration example of a power conversion apparatus 100 according to the first embodiment. As illustrated in FIG. 1, the power conversion apparatus 100 according to the first embodiment includes a reactor 5, a rectifier circuit 6, a smoothing capacitor 7, an inverter 8, a control unit 10, voltage detection units 11 and 13, a current detection unit 12, and a gate circuit unit 14. In the following description, the voltage detection unit 11 may be referred to as a "first voltage detection unit", and the voltage detection unit 13 may be referred to as a "second voltage detection unit" case by case.

The power conversion apparatus 100 applies an alternating-current voltage to a motor 52 to drive the motor 52. An alternating-current power supply 50 is an AC power supply configured to apply a power supply voltage Vs to the power conversion apparatus 100. The motor 52 is used as a driving means for driving a load not illustrated in figures. One example of the load is a compressor. The compressor is equipped in a refrigeration cycle of an air conditioner, a refrigerator, or a freezer.

A typical rectifier circuit has a configuration in which four diodes are connected in bridge connection. By contrast, the rectifier circuit 6 of the first embodiment is a DBL rectifier circuit. The DBL rectifier circuit has a configuration in which four switching elements are connected in bridge connection. In other words, in the DBL rectifier circuit, the four diodes are replaced by switching elements, respectively.

The rectifier circuit 6 includes a first leg 30 and a second leg 32 connected in parallel with the first leg 30. The first leg 30 includes a switching element 1 that is a first upper-arm element and a switching element 2 that is a first lower-arm element. The switching elements 1 and 2 are connected in series with each other. The second leg 32 includes a switching element 3 that is a second upper-arm element and a switching element 4 that is a second lower-arm element. The switching elements 3 and 4 are connected in series with each other. The first and second upper-arm elements are connected to a positive electrode of the smoothing capacitor 7, and the first and second lower-arm elements are connected to a negative electrode of the smoothing capacitor 7.

In FIG. 1, a diode is connected in parallel with each of the switching elements 1 to 4. An example of each of the switching elements 1 to 4 is a MOSFET that is illustrated in this figure. The MOSFETs used as the switching elements 1 to 4 have their respective parasitic diodes in the inside thereof. For this reason, when the MOSFETs are used, the parasitic diodes are usable, thus making it possible to omit diodes to be connected in parallel with the MOSFETs.

Unlike a unidirectional element such as a diode that allows an electric current to flow in only one direction, the MOSFET is generally a bidirectional element that allows an electric current to flow in both directions. In other words, supplying electric charges to a gate of the MOSFET for turning on the MOSFET enables the current to flow in an opposite direction. The said opposite direction means a direction opposite to a direction of the current flowing through the parasitic diode built in the MOSFET.

The reactor 5 has one end connected to one side of the alternating-current power supply 50 and an opposite end connected to a connection point 34 between the switching elements 1 and 2. A connection point 36 between the switching elements 3 and 4 is connected to an opposite side of the alternating-current power supply 50. The reactor 5 may be connected to the opposite side of the alternating-current power supply 50 in an alternative to the configuration of FIG. 1. Another alternative is that the reactor 5 may be divided into two that are connected respectively to the one side and the opposite side of the alternating-current power supply 50. In any of the configurations, a connection configuration is such that the power supply voltage Vs is applied as an alternating-current voltage outputted by the alternating-current power supply 50 to the rectifier circuit 6 between the connection point 34 and the connection point 36 via the reactor 5. The connection points 34 and 36 serve as input terminals of the rectifier circuit 6.

The smoothing capacitor 7 is connected between output terminals of the rectifier circuit 6. The rectifier circuit 6 rectifies the power supply voltage Vs applied from the alternating-current power supply 50 via the reactor 5 to convert it into a direct-current voltage.

The smoothing capacitor 7 is charged with the output of the rectifier circuit 6. The smoothing capacitor 7 smooths the output voltage of the rectifier circuit 6. The inverter 8 is connected to both ends of the smoothing capacitor 7. The inverter 8 converts a direct-current voltage Vdc smoothed by the smoothing capacitor 7 into a drive voltage for the motor 52 and applies the drive voltage to the motor 52.

The motor 52 includes rotation sensors 54. The rotation sensors 54 perform position or speed detection of a rotor (not illustrated) of the motor 52. A detected value from each of the rotation sensors 54 is inputted to the control unit 10. On the basis of the detected values of the rotation sensors 54, the control unit 10 calculates a rotational speed of the motor 52.

The voltage detection unit 13 detects the power supply voltage Vs. The voltage detection unit 11 detects the direct-current voltage Vdc smoothed by the smoothing capacitor 7. The direct-current voltage Vdc also serves as an input voltage to the inverter 8. A detected value of the power supply voltage Vs and a detected value of the direct-current voltage Vdc are inputted to the control unit 10.

The current detection unit 12 detects a primary current Is that flows in an input side of the rectifier circuit 6. The primary current Is is also a reactor current that flows through the reactor 5. A detected value of the primary current Is is inputted to the control unit 10. In FIG. 1, a configuration is exemplified such that a detector of the current detection unit 12 is set at an electric wire on the one side of the alternating-current power supply 50, but the present disclosure is not necessarily limited to this example. The current detection unit 12 may have a detector set at an electric wire on the opposite side of the alternating-current power supply 50.

On the basis of the detected values of the power supply voltage Vs, the primary current Is, and the direct-current voltage Vdc, as well as the rotational speed of the motor 52, the control unit 10 generates control signals for controlling conduction of the switching element 1, 2, 3, and 4 and outputs the control signals to the gate circuit unit 14.

On the basis of the control signals outputted from the control unit 10, the gate circuit unit 14 generates and outputs gate signals Q1, Q2, Q3, and Q4 for driving the switching elements 1, 2, 3, and 4. The gate signal Q1 is a signal for controlling the conduction of the switching element 1 to be turned off from an on-state or vice versa. The gate signal Q2 is a signal for controlling the conduction of the switching element 2 to be turned off from an on-state or vice versa. The gate signal Q3 is a signal for controlling the conduction of the switching element 3 to be turned off from an on-state or vice versa. The gate signal Q4 is a signal for controlling the conduction of the switching element 4 to be turned off from an on-state or vice versa.

When driving the switching element 1, 2, 3, and 4, the gate signal Q1, Q2, Q3, and Q4 are caused to have a voltage level that can drive the switching element 1, 2, 3, and 4 and to be outputted. The gate circuit unit 14 can be realized using a level-shift circuit and/or the like.

The control unit 10 includes a processor 10a and a memory 10b. The processor 10a corresponds to an operation means such as an arithmetic unit, a microprocessor, a microcomputer, a central processing unit (CPU), or a digital signal processor (DSP). The memory 10b corresponds to a nonvolatile or volatile semiconductor memory such as a random-access memory (RAM), a read-only memory (ROM), a flash memory, an erasable programmable ROM (EPROM), or an electrically EPROM (EEPROM) (registered trademark).

In the memory 10b, programs configured to implement functions of the control unit 10 are stored. The processor 10a transmits and receives necessary information via an interface that includes an analog-to-digital converter (not illustrated) and a digital-to-analog converter (not illustrated). The processor 10a executes the program stored in the memory 10b to thereby perform required processing. Operation results of the processor 10a are stored in the memory 10b.

Figure 2:
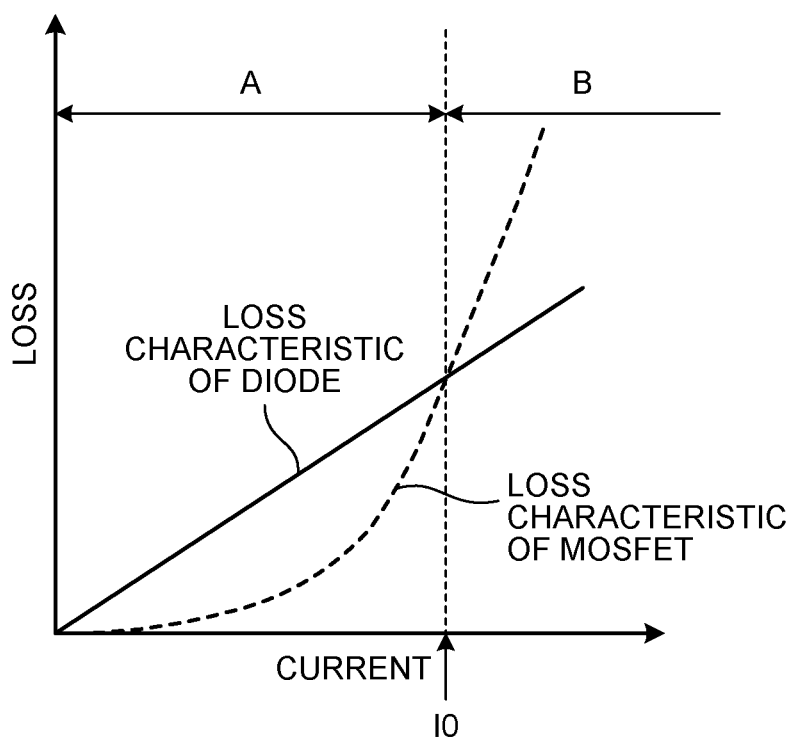
FIG. 2 is a graph schematically illustrating a current-loss characteristic of a typical metal-oxide-semiconductor field-effect transistor (MOSFET).

FIG. 2 is a graph schematically illustrating a current-loss characteristic of a typical MOSFET. Illustrated in FIG. 2 are a loss characteristic of a diode and a loss characteristic of the MOSFET when the MOSFET is in on-operation. As illustrated in FIG. 2, in a range A in which the current level is smaller than a current value I0, the diode has a greater loss than the switching element. In a range B in which the current level is greater than the current value I0, the diode has a smaller loss than the switching element. In view of these characteristics, synchronous rectification is used to have an advantage such that a switching element connected in antiparallel with a diode is caused to be in an on-operation at the timing when the primary current Is flows through the diode, thereby making it possible to operate the apparatus with high efficiency.

Figure 3:
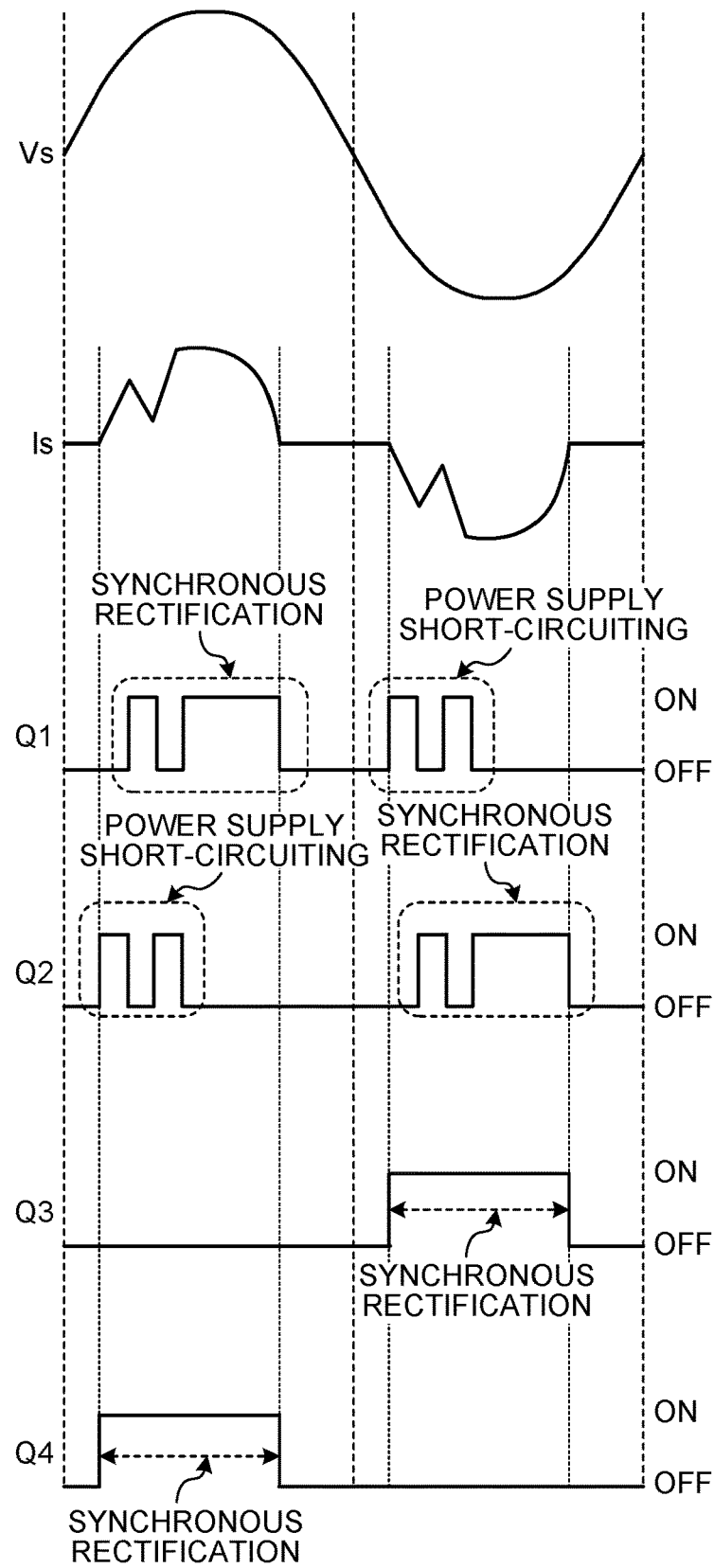
FIG. 3 is a chart illustrating one switching pattern pertaining to a basic operation of a rectifier circuit in the first embodiment.
Figure 4:
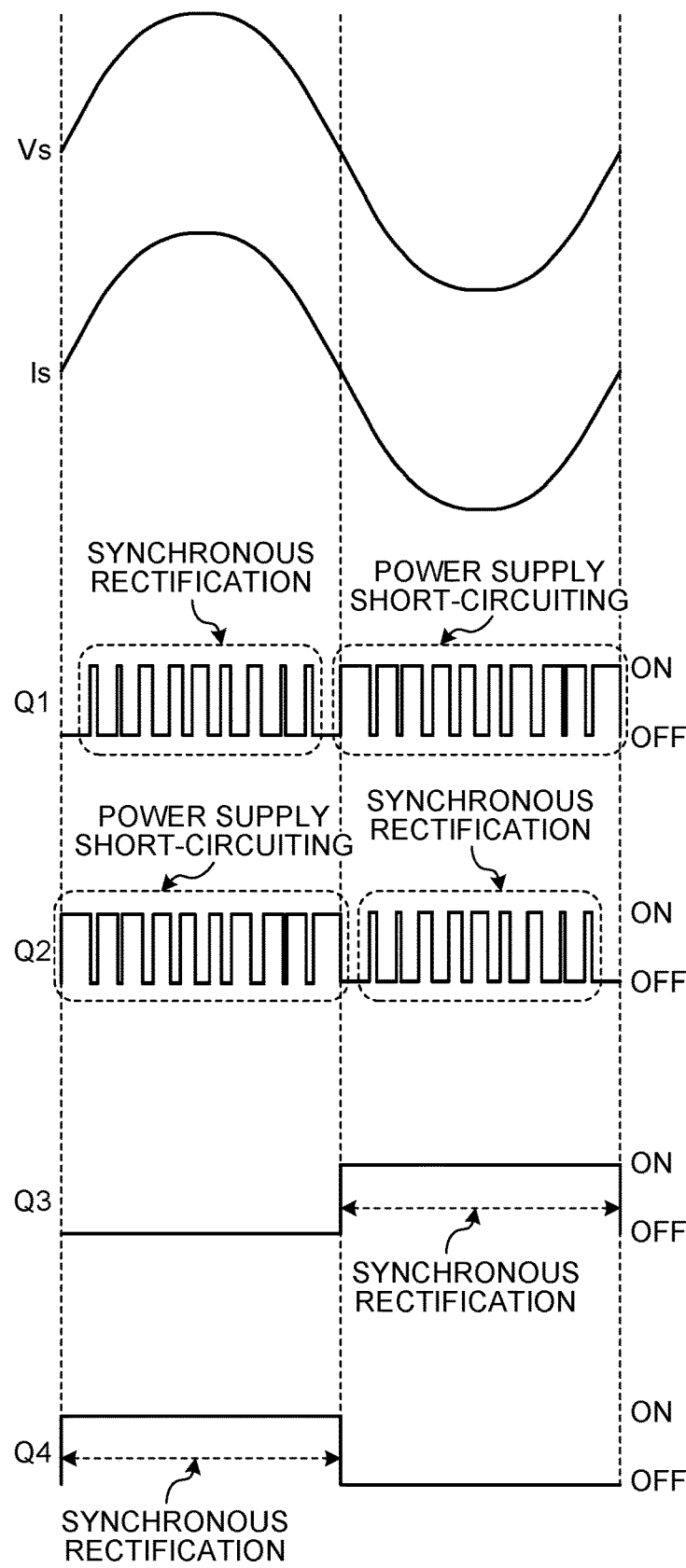
FIG. 4 is a chart illustrating another switching pattern pertaining to a basic operation of the rectifier circuit in the first embodiment.

With reference to FIGS. 3 and 4, a description is provided next of a basic operation of the power conversion apparatus 100 according to the first embodiment. FIG. 3 is a chart illustrating one switching pattern pertaining to a basic operation of the rectifier circuit 6 according to the first embodiment. FIG. 4 is a chart illustrating another switching pattern pertaining to the basic operation of the rectifier circuit 6 according to the first embodiment. A horizontal axis in each of FIGS. 3 and 4 represents time. Each of FIGS. 3 and 4 illustrates, from its top toward the bottom, operating waveforms of the power supply voltage Vs, the primary current Is, the gate signal Q1, the gate signal Q2, the gate signal Q3, and the gate signal Q4. Regarding polarity of the power supply voltage Vs, when the power supply voltage Vs has a positive value, polarity of the power supply voltage Vs is referred to as "positive polarity", while when the power supply voltage Vs has a negative value, the polarity of the power supply voltage Vs is referred to as "negative polarity".

When the power supply voltage Vs in FIG. 3 is of positive polarity, the switching element 4 is controlled to be on during a period in which the current flows through the parallel-connected diode. In other words, when the power supply voltage Vs has positive polarity, the switching element 4 is controlled to be on at a timing when the current flows through the parallel-connected diode but to be off at a timing when the current does not flow through the parallel-connected diode. This operation refers to the above-stated synchronous rectification.

When the power supply voltage Vs is of negative polarity, the switching element 3 is controlled to be on during a period in which the current flows through the parallel-connected diode. In other words, when the power supply voltage Vs has negative polarity, the switching element 3 is controlled to be on at a timing when the current flows through the parallel-connected diode but to be off at a timing when the current does not flow through the parallel-connected diode. This operation refers to the synchronous rectification, too.

When the power supply voltage Vs in FIG. 3 is of positive polarity, the switching element 2 is controlled to be on at a timing when the switching element 4 is controlled to be on. In this time, the primary current Is flows in the rectifier circuit 6 along a path through the alternating-current power supply 50, the reactor 5, the switching element 2, the switching element 4, and the alternating-current power supply 50. This operation is referred to as "power supply short-circuiting" because it is an operation in which the primary current Is is caused to flow without interposing the smoothing capacitor 7.

By an operation of the power supply short-circuiting, energy is stored in the reactor 5. Then, by an operation of synchronous rectification performed immediately thereafter, the energy stored in the reactor 5 is released into the smoothing capacitor 7. Accordingly, the direct-current voltage Vdc that is a voltage across the smoothing capacitor 7 is boosted.

In the power supply short-circuiting, the switching element 1 is controlled to be off. The reason comes from a purpose of preventing electric charges stored in the smoothing capacitor 7 from flowing through the switching elements 1 and 2. In FIG. 3, an example is shown in which the power supply short-circuiting is performed twice, but the present disclosure is not necessarily limited to this example. The power supply short-circuiting may be performed only once or between three times and several times, inclusive.

When the power supply voltage Vs is of positive polarity, switching control is performed once or more on the switching element 2, and thereafter the normal synchronous rectification comes back. Specifically, the switching element 1 is controlled to be on during a period in which the switching element 4 is controlled to be on. The switching element 1 that is the upper-arm element and the switching element 4 that is the lower-arm element have a diagonal relationship in connecting position therebetween.

When the power supply voltage Vs is of negative polarity, the switching element 1 is controlled to be on at the timing when the switching element 3 is controlled to be on. At this time, the primary current Is flows into the rectifier circuit 6 along a path through the alternating-current power supply 50, the switching element 3, the switching element 1, the reactor 5, and the alternating-current power supply 50. This operation, too, refers to an operation of the power supply short-circuiting in which the primary current Is is caused to flow without interposing the smoothing capacitor 7. In this short-circuiting, the switching element 2 is controlled to be off. The reason comes from a purpose of preventing electric charges stored in the smoothing capacitor 7 from flowing through the switching elements 1 and 2. An example is shown here in which the power supply short-circuiting is performed twice in a similar manner to a positive half cycle of FIG. 3, but the power supply short-circuiting may be performed once or between three times and several times, inclusive.

When the power supply voltage Vs is of negative polarity, switching control is performed once or more on the switching element 1, and thereafter the normal synchronous rectification comes back. Specifically, the switching element 2 is controlled to be on during a period in which the switching element 3 is controlled to be on. The switching element 2 that is the lower-arm element and the switching element 3 that is the upper-arm element have a diagonal relationship in connecting position therebetween.

A description is provided next for an operation in FIG. 4. First, the switching element 4 is controlled to be on during a period in which the power supply voltage Vs is of positive polarity but to be off during a period in which the power supply voltage Vs is of negative polarity. The switching element 3 is controlled to be off during the period in which the power supply voltage Vs is of positive polarity but to be on during the period in which the power supply voltage Vs is of negative polarity.

When the power supply voltage Vs is of positive polarity, the switching element 2 is controlled to be on at a timing when the switching element 4 is controlled to be on. This operation refers to an operation of the power supply short-circuiting. After the power supply short-circuiting operation, the switching element 2 is controlled to be off, and the switching element 1 is controlled to be on. This operation refers to an operation of the synchronous rectification. Thereafter, the switching elements 1 and 2 are controlled to be alternately turned on and off, and the power supply short-circuiting operation and the synchronous rectification operation are performed alternately and repeatedly.

When the power supply voltage Vs is of negative polarity, the switching element 1 is controlled to be on at a timing when the switching element 3 is controlled to be on. This operation refers to an operation of the power supply short-circuiting. After the power supply short-circuiting operation, the switching element 1 is controlled to be off, and the switching element 2 is controlled to be on. This operation refers to an operation of the synchronous rectification. Thereafter, the switching elements 1 and 2 are controlled to be alternately turned on and off, and the power supply short-circuiting operation and the synchronous rectification operation are performed alternately and repeatedly.

The above operation boosts the direct-current voltage Vdc to a voltage above the power supply voltage Vs. Moreover, a power factor improves since the primary current Is flows throughout the entire half cycle of the power supply voltage Vs.

The operation in FIG. 3 and the operation in FIG. 4 differ from each other in whether or not the switching control is performed entirely over one cycle of the power supply voltage Vs. Therefore, the operation in FIG. 4 may be referred to as "full-cycle switching", and the operation in FIG. 3 may be referred to as "partial switching" in some cases. When a difference in switching speed therebetween is put into focus, the operation in FIG. 4 may be referred to as "higher speed switching", and the operation in FIG. 3 may be referred to as "lower speed switching".

The operation in FIG. 4 is more suitable to provide a larger boosting ratio. On the other hand, the operation in FIG. 3 is more suitable to reduce switching losses. Therefore, switching between the operation in FIG. 3 and the operation in FIG. 4 in accordance with the rotational speed of the motor 52 enables efficiency to be improved while making a variable width of the direct-current voltage Vdc larger.

A description is provided next for an operation of a principal part of the power conversion apparatus 100 according to the first embodiment. Before the description of the operation of the principal part, a description is provided for paths of the primary current Is that flows in the rectifier circuit 6 of the first embodiment.

Figure 5:
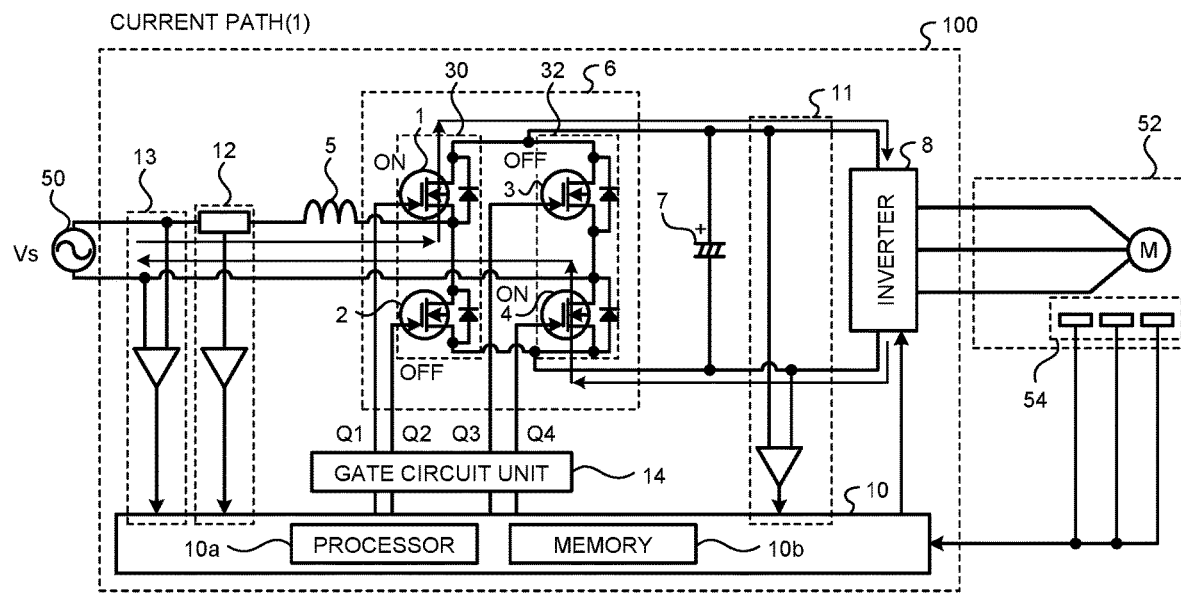
FIG. 5 is a diagram illustrating a first path of an electric current that flows into the rectifier circuit of the first embodiment.

FIG. 5 is a diagram illustrating a first path of the electric current that flows in the rectifier circuit 6 of the first embodiment. The current path illustrated in FIG. 5 is defined as a "current path (1)". In FIG. 5, there is illustrated a current path formed by the synchronous rectification when the power supply voltage Vs is of positive polarity. The switching elements 1 and 4 are in an ON state, and the switching elements 2 and 3 are in an OFF state. In this state, the current flows along the path through the alternating-current power supply 50, the reactor 5, the switching element 1, the inverter 8, the switching element 4, and the alternating-current power supply 50.

Figure 6:
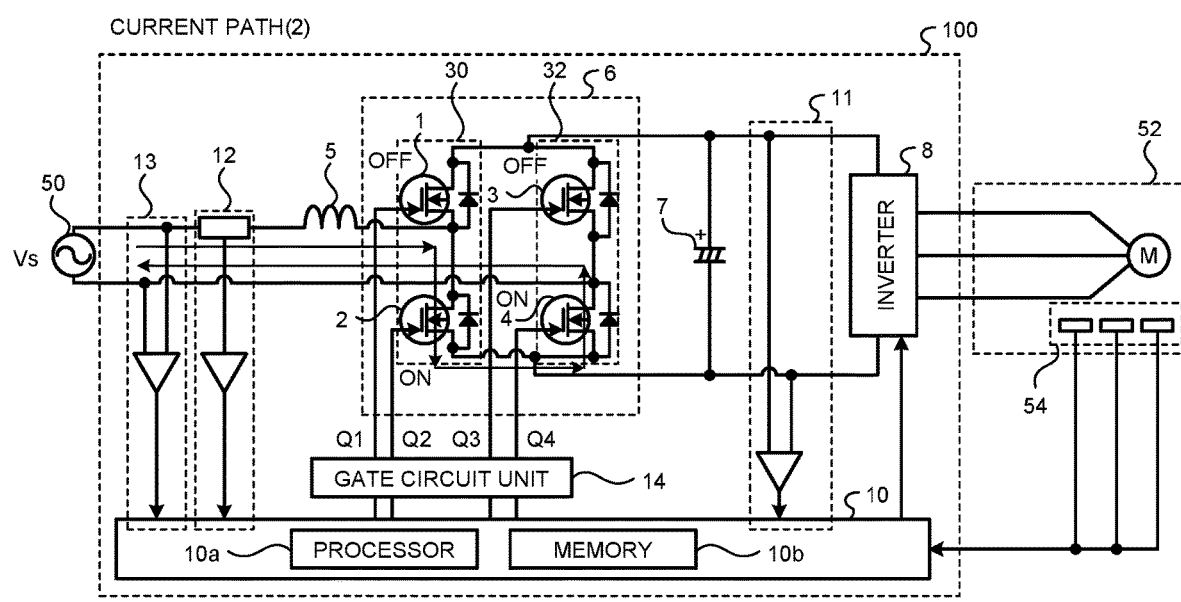
FIG. 6 is a diagram illustrating a second path of an electric current that flows into the rectifier circuit of the first embodiment.

FIG. 6 is a diagram illustrating a second path of the electric current that flows in the rectifier circuit 6 of the first embodiment. The current path illustrated in FIG. 6 is defined as a "current path (2)". In FIG. 6, there is illustrated a current path formed by the power supply short-circuiting when the power supply voltage Vs is of positive polarity. The switching elements 2 and 4 are in the ON state, and the switching elements 1 and 3 are in the OFF state. In this state, the current flows along the path through the alternating-current power supply 50, the reactor 5, the switching element 2, the switching element 4, and the alternating-current power supply 50.

Figure 7:
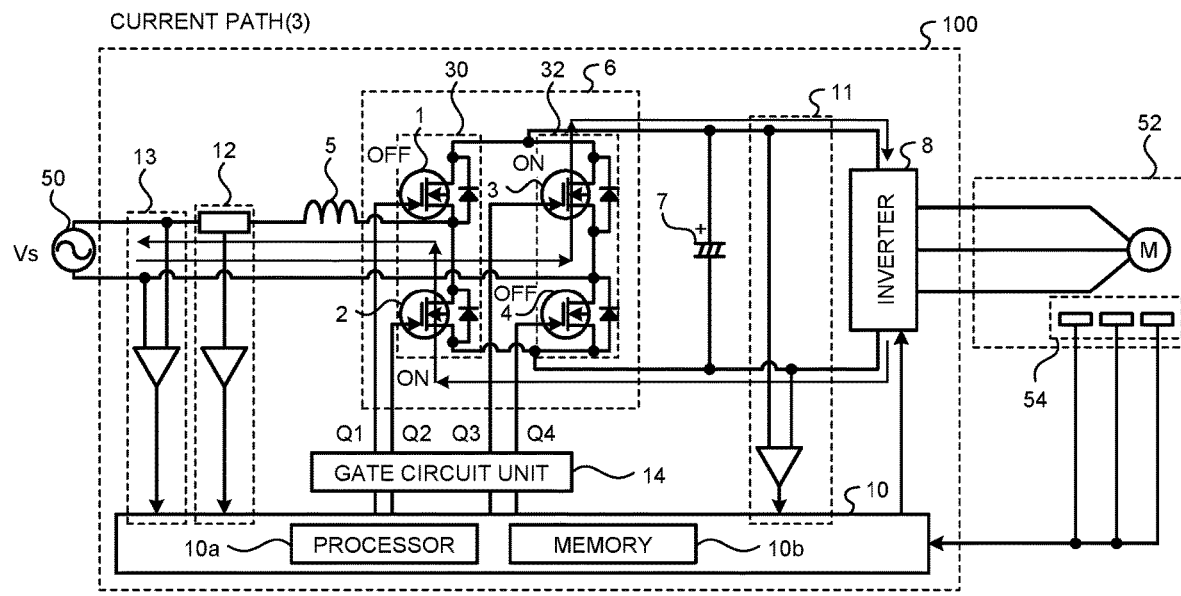
FIG. 7 is a diagram illustrating a third path of an electric current that flows into the rectifier circuit of the first embodiment.

FIG. 7 is a diagram illustrating a third path of the current that flows in the rectifier circuit 6 of the first embodiment. The current path illustrated in FIG. 7 is defined as a "current path (3)". In FIG. 7, there is shown a current path formed by the synchronous rectification when the power supply voltage Vs is of negative polarity. The switching elements 2 and 3 are in the ON state, and the switching elements 1 and 4 are in the OFF state. In this state, the current flows along the path through the alternating-current power supply 50, the switching element 3, the inverter 8, the switching element 2, the reactor 5, and the alternating-current power supply 50.

Figure 8:
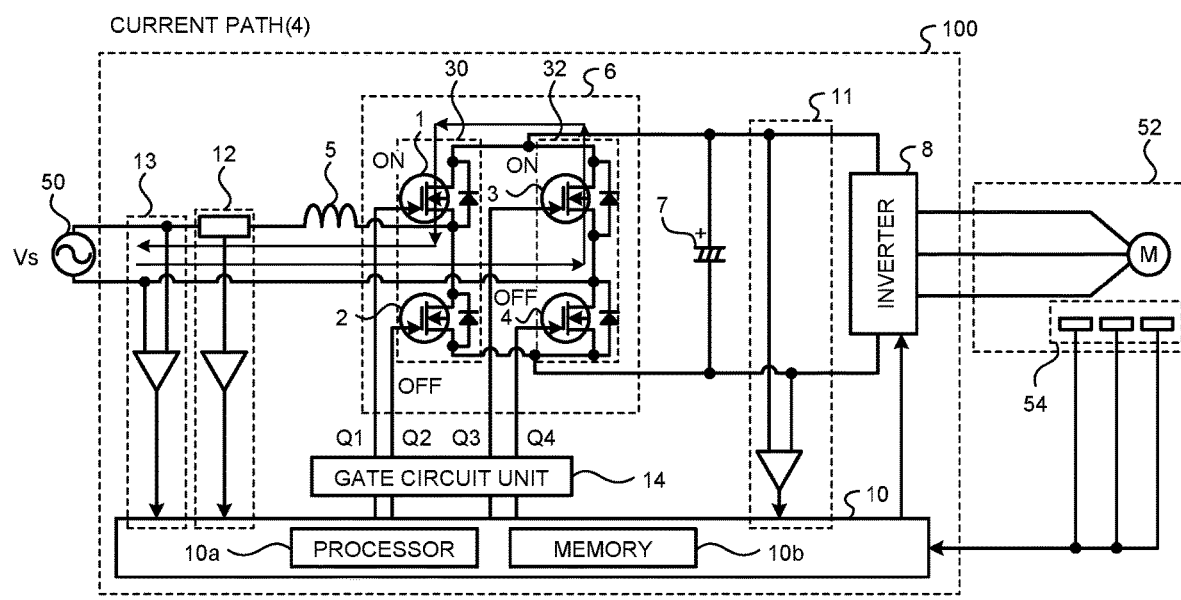
FIG. 8 is a diagram illustrating a fourth path of an electric current that flows into the rectifier circuit of the first embodiment.

FIG. 8 is a diagram illustrating a fourth path of the current that flows in the rectifier circuit 6 of the first embodiment. The current path illustrated in FIG. 8 is defined as a "current path (4)". In FIG. 8, there is shown a current path formed by the power supply short-circuiting when the power supply voltage Vs is of negative polarity. The switching elements 1 and 3 are in the ON state, and the switching elements 2 and 4 are in the OFF state. In this state, the current flows along the path through the alternating-current power supply 50, the switching element 3, the switching element 1, the reactor 5, and the alternating-current power supply 50.

Figure 9:
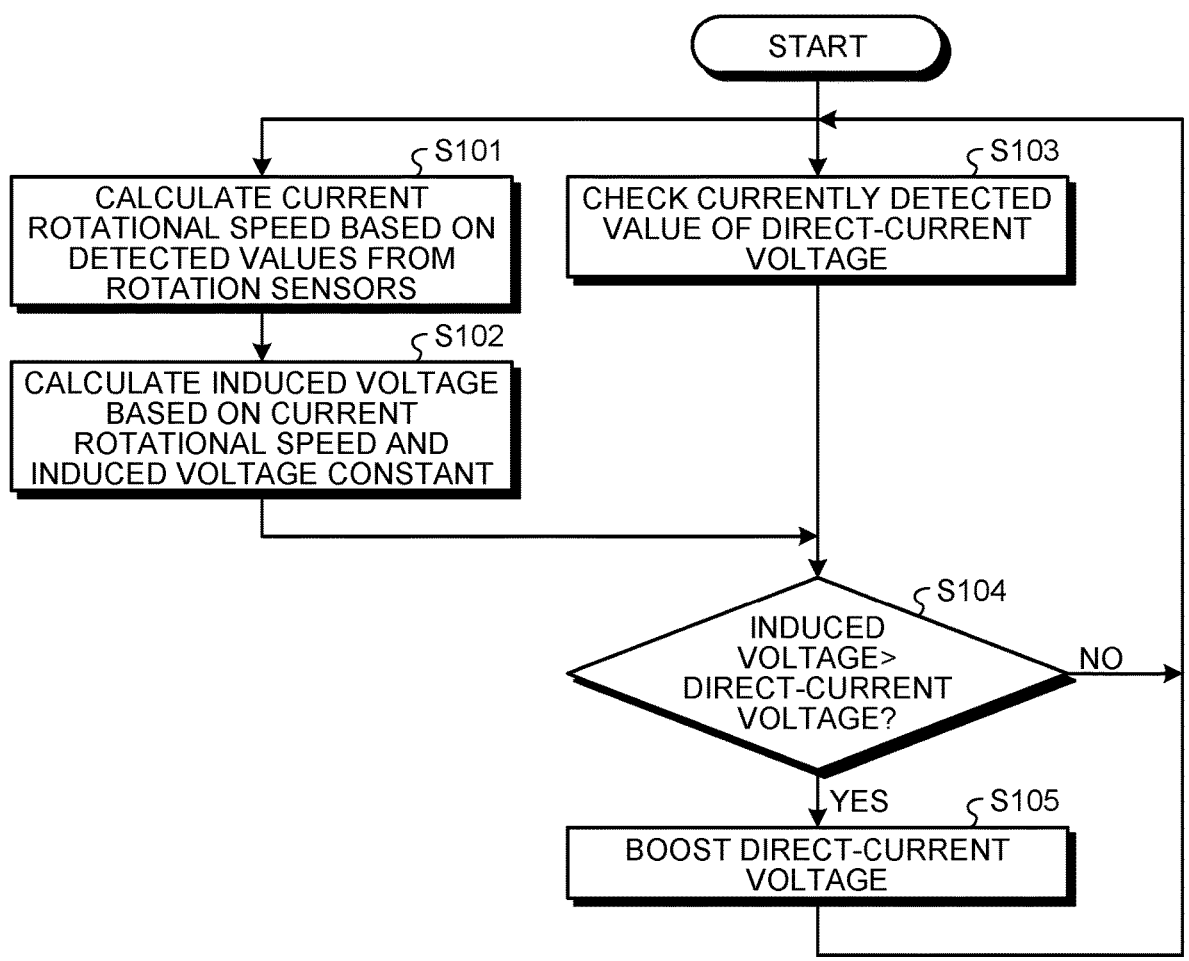
FIG. 9 is a flowchart that is used for explaining an operation of a principal part in the first embodiment.

FIG. 9 is a flowchart that is used for explaining the operation of the principal part in the first embodiment. On the basis of detected values of the rotation sensors 54, the control unit 10 calculates a current rotational speed of the motor 52 (step S101). Next, the control unit 10 calculates an induced voltage induced in the motor 52 on the basis of the current rotational speed and an induced voltage constant (step S102). The larger the induced voltage constant is, the larger is the induced voltage. In addition, the higher the rotational speed is, the larger is the induced voltage. The induced voltage constant is one of parameters used to record characteristics of a motor to be used. Data on motor constants including the induced voltage constant is stored in the memory 10b inside the control unit 10.

In parallel with a process of step S101, the control unit 10 checks a currently detected value of the direct-current voltage (step S103). The control unit 10 compares the induced voltage with the direct-current voltage (step S104). If the induced voltage is less than or equal to the direct-current voltage (step S104: No), the control unit 10 returns to the beginning of the flow and repeats the processes of steps S101 and S103. If, on the other hand, the induced voltage is greater than the direct-current voltage (step S104: Yes), the direct-current voltage is boosted in a particular process (step S105). After the process of step S105, it returns to the beginning of the flow, and the processes of steps S101 and S103 are repeated.

Although a determination is "No" at the above-described step S104 when the induced voltage is equal to the direct-current voltage, the determination may be "Yes". In other words, when the induced voltage is equal to the direct-current voltage, the determination may be either "Yes" or "No".

Figure 10:
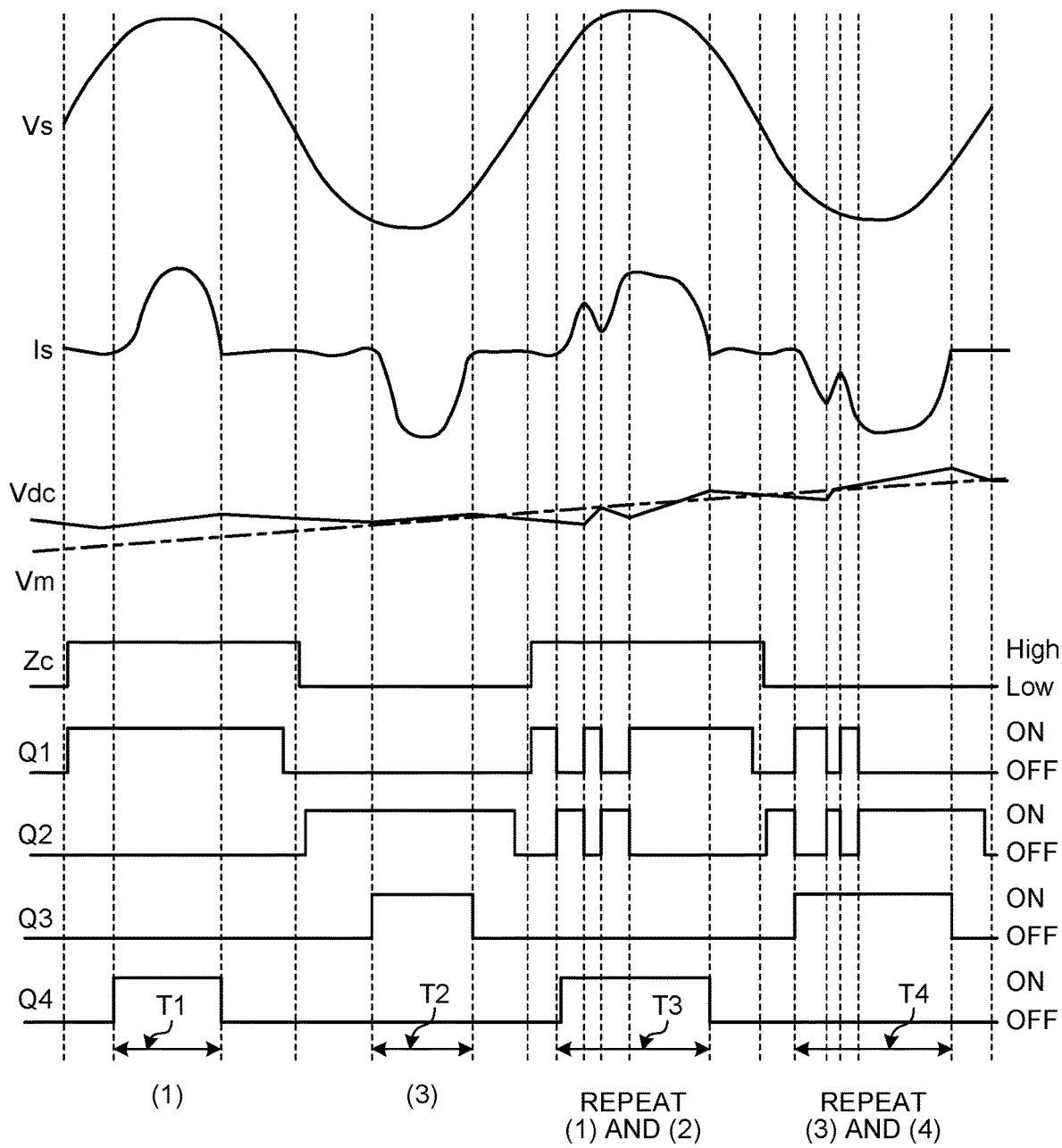
FIG. 10 is a time chart that is used for explaining the operation of the principal part in the first embodiment.

FIG. 10 is a time chart that is used for explaining the operation of the principal part in the first embodiment. FIG. 10 illustrates operating waveforms associated with the principal part that operates according to the flowchart of FIG. 9. Specifically, FIG. 10 illustrates, from its top toward the bottom, operating waveforms of the power supply voltage Vs, the primary current Is, the direct-current voltage Vdc, the induced voltage Vm, a zero cross signal Zc, the gate signal Q1, the gate signal Q2, the gate signal Q3, and the gate signal Q4. A horizontal axis represents time. The direct-current voltage Vdc is represented by a solid line, and the induced voltage Vm is represented by a dot-and-dash line.

The zero cross signal Zc is a signal generated in the inside of the control unit 10 on the basis of the detected value of the power supply voltage Vs. In FIG. 10, "High" is outputted when the power supply voltage Vs is of positive polarity, and "Low" is outputted when the power supply voltage Vs is of negative polarity, but the present disclosure is not necessarily limited to this example. The zero cross signal Zc may be a signal for which "Low" is outputted when the power supply voltage Vs is of positive polarity and "High" is outputted when the power supply voltage Vs is of negative polarity.

When the power supply voltage Vs is of positive polarity, that is to say, when the zero cross signal Zc is High as described above, the gate signal Q4 is turned on at a timing when the primary current Is flows. When the power supply voltage Vs is of negative polarity, that is to say, when the zero cross signal Zc is Low, the gate signal Q3 is turned on at a timing when the primary current Is flows.

The operating waveforms of FIG. 10 show here that the direct-current voltage Vdc is greater than the induced voltage Vm in a period T1 during which the gate signal Q4 is on. Therefore, no boosting operation is performed, and an electric current flows along the current path (1), which is defined above. In FIG. 10, the current path (1) is written as "(1)". The other current paths are similarly written below.

The direct-current voltage Vdc is greater than the induced voltage Vm even in a period T2 during which the gate signal Q3 is on. Therefore, no boosting operation is performed, and an electric current flows along the current path (3), which is defined above.

On the other hand, in a subsequent cycle of the power supply voltage Vs, there is a period in which the induced voltage Vm becomes greater than the direct-current voltage Vdc. Therefore, in a period T3 during which the gate signal Q4 is on, the operation that causes the current to flow along the current path (1) and the operation that causes the current to flow along the current path (2) are repeated. Moreover, in a period T4 during which the gate signal Q3 is on, the operation that causes the current to flow along the current path (3) and the operation that causes the current to flow along the current path (4) are repeated. In other words, the synchronous rectification and the boosting are repeated in the periods T3 and T4.

In the periods T3 and T4, switching between the synchronous rectification and the boosting is performed without changing switching operations of the gate signals Q3 and Q4 involved with the synchronous rectification. In other words, in the periods T3 and T4, it is possible to switch between the synchronous rectification and the boosting operation without interposing any period of suspension in switching therebetween.

When the rotational speed of the motor 52 is higher, the induced voltage Vm of the motor 52 is larger. Therefore, under the same load condition, a motor current, that is to say, an electric current flowing in the motor 52 increases, and the motor 52 has increased loss. By contrast, in the control according to the first embodiment, the switching is done from the synchronous rectification to the boosting to boost the direct-current voltage Vdc when the induced voltage Vm of the motor 52 is greater than the direct-current voltage Vdc, so that the motor current can be restrained from increasing. In this way, a further efficiency improvement is enabled in a higher speed rotation range of the motor 52.

In the control according to the first embodiment, switching between the synchronous rectification and the boosting can be realized without interposing any period of suspension in the switching therebetween, thereby making it possible to quickly switch between the synchronous rectification and the boosting operation. As a result, loss associated with the boosting can be prevented from increasing.

Figure 11:
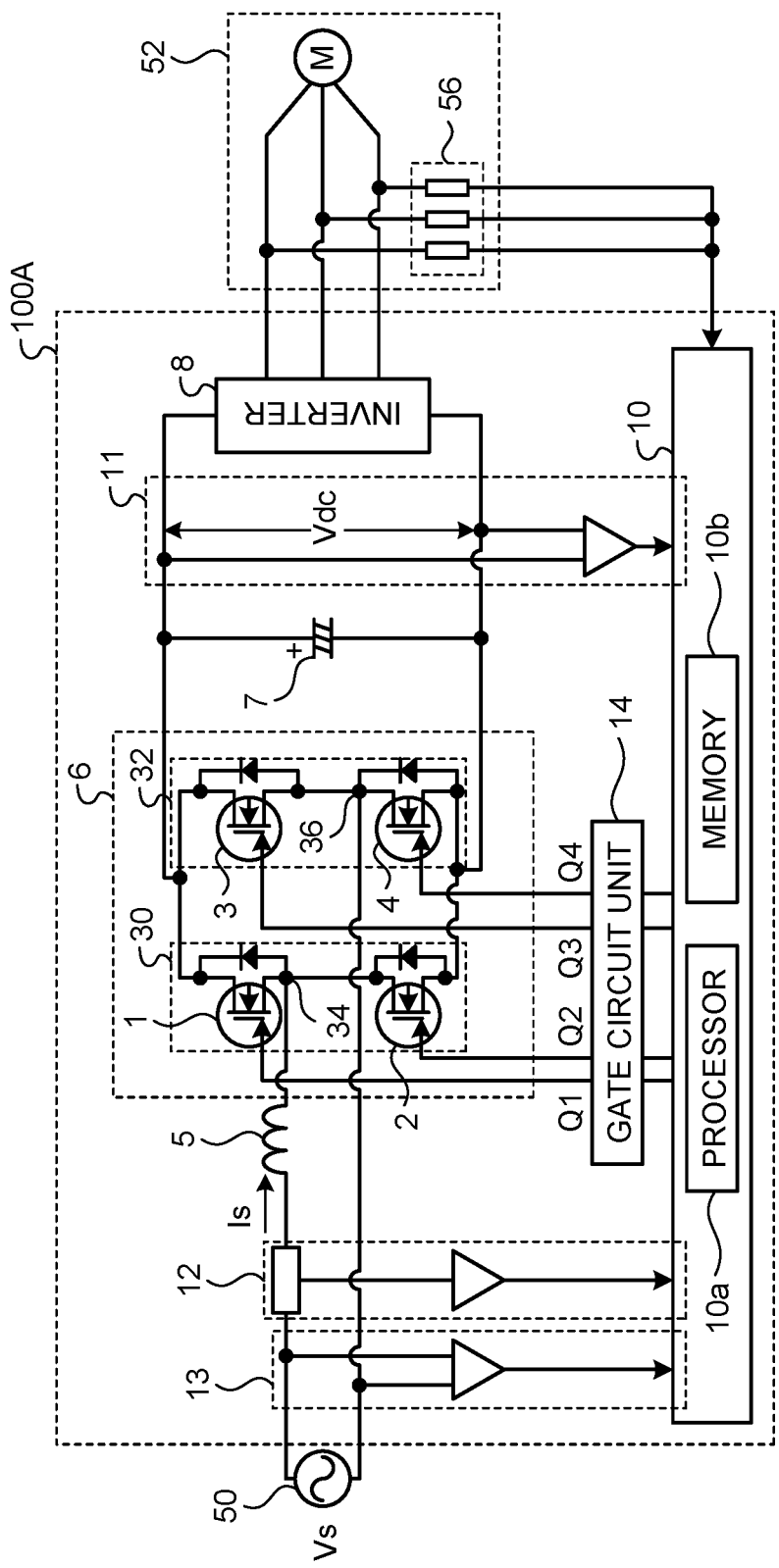
FIG. 11 is a diagram illustrating a configuration example of a power conversion apparatus according to a modification of the first embodiment.

In the FIG. 1, there is illustrated a configuration in which the motor 52 includes the rotation sensors 54, but the present disclosure is not necessarily limited to this example. For example, the configuration may be modified as illustrated in FIG. 11. FIG. 11 illustrates a configuration example of a power conversion apparatus 100A according to a modification of the first embodiment. As illustrated in FIG. 11, it may be configured with the motor 52 having induced voltage detectors 56 whose detected values are inputted to the control unit 10 of the power conversion apparatus 100A. Each of the induced voltage detectors 56 is a detector that directly detects an induced voltage induced in a winding (not illustrated) of the motor 52.

The detected value of the induced voltage detector 56 is inputted to the control unit 10. Since calculation of the induced voltage is unnecessary in the case of the power conversion apparatus 100A illustrated in FIG. 11, the processes of steps S101 and S102 can be omitted from the flowchart of FIG. 9.

Although three detectors are illustrated in FIG. 11, at least one detector suffices.

In the configurations of the FIG. 1 and FIG. 11, the switching elements 1 to 4, the rectifier elements used to form the rectifier circuit 6, and switching elements constituting the inverter 8 are each generally formed using, but not limited to, a semiconductor element made with or from a silicon-material. Among these semiconductor elements, the switching elements 1 to 4, the rectifier elements used to form the rectifier circuit 6, or the switching elements constituting the inverter 8 may be made with or from a wide band gap (WBG) semiconductor such as silicon carbide, gallium nitride, gallium oxide, or diamond.

The WBG semiconductor generally provides low loss compared with a silicon semiconductor. Therefore, when these semiconductor elements are made using the WBG semiconductor, the apparatus can be configured to have lower loss. The WBG semiconductor also has a high voltage resistance compared with the silicon semiconductor. Therefore, each of the semiconductor elements has increased voltage resistance and increased allowable current density, so that a semiconductor module having the semiconductor switching elements incorporated therein can be downsized. Furthermore, the WBG semiconductor has a higher thermal resistance, thus enabling a heat sink for dissipating heat generated by the semiconductor module to be downsized and enabling a heat dissipation structure for dissipating heat generated by the semiconductor module to be simplified.

As described above, the power conversion apparatus according to the first embodiment includes the reactor and the rectifier circuit to which the power supply voltage outputted by the alternating-current power supply is applied via the reactor. The rectifier circuit includes the first leg and the second leg that is connected in parallel with the first leg. The first leg has the first upper-arm element and the first lower-arm element connected in series with each other, and the second leg has the second upper-arm element and the second lower-arm element connected in series with each other. The control unit controls the operation of the first upper-arm element and the first lower-arm element on the basis of the detected value of the direct-current voltage and the induced voltage induced in the motor, wherein the detected value is obtained by detecting a direct-current voltage smoothed by the smoothing capacitor by which an output voltage of the rectifier circuit is smoothed. In this way, the further efficiency improvement can be achieved in the motor's higher speed rotation range where the induced voltage of the motor is higher. Each of the second upper-arm and lower-arm elements is controlled to be on at the timing when the current flows through the corresponding parallel-connected diode but to be off at the timing when the current does not flow through the corresponding diode.

In the above-mentioned control, when the induced voltage is smaller than the detected value of the direct-current voltage, the first upper-arm and lower-arm elements are controlled to be on and off alternately every half cycle of the power supply voltage. When the induced voltage is changed from a level smaller than the detected value of the direct-current voltage to a level greater than the detected value of the direct-current voltage, the first upper-arm element and the first lower-arm element are controlled to be on and off alternately within a half cycle with the same polarity without regard for what is the polarity of the power supply voltage. This control enables the switching between the synchronous rectification and the boosting operation to be quicker, thereby making it possible to prevent the loss associated with the boosting from increasing.

Second Embodiment

Figure 12:
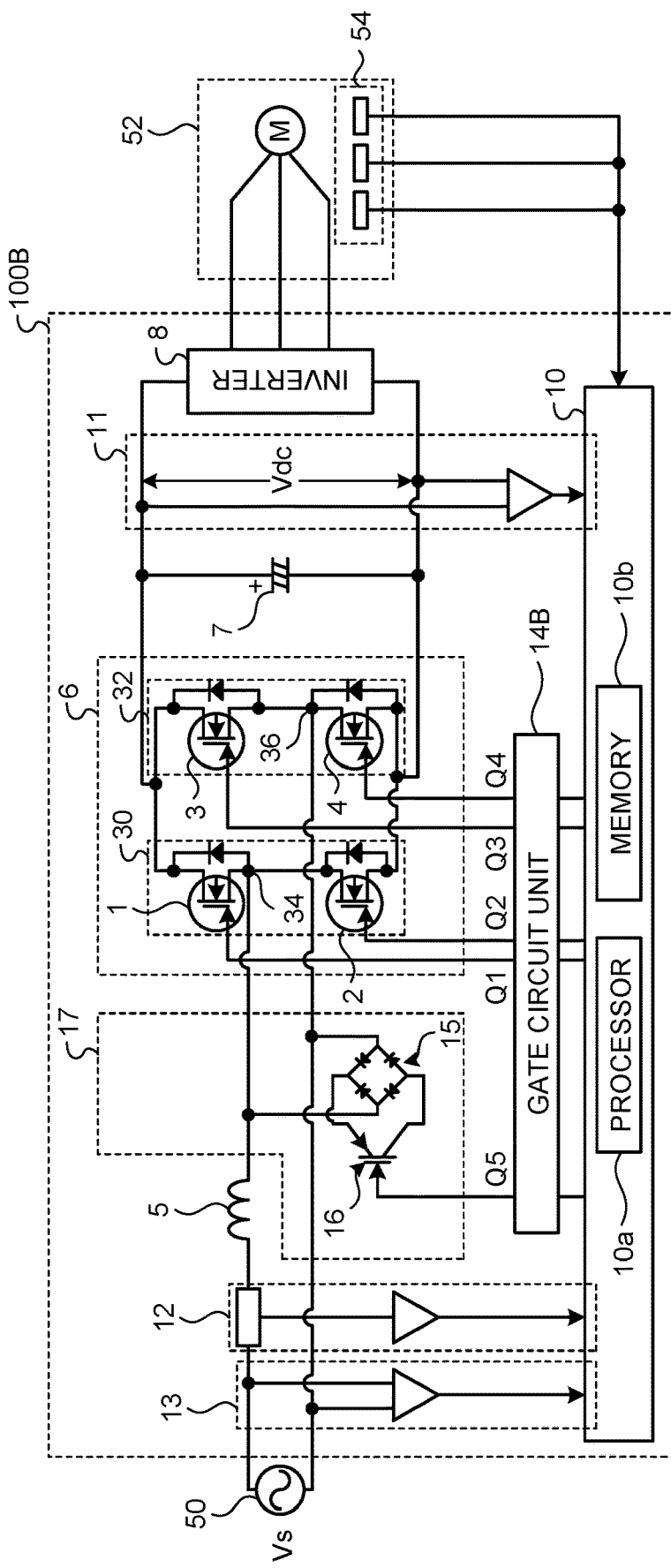
FIG. 12 is a diagram illustrating a configuration example of a power conversion apparatus according to a second embodiment.

FIG. 12 is a diagram illustrating a configuration example of a power conversion apparatus 100B according to the second embodiment. The power conversion apparatus 100B according to the second embodiment is based on the configuration of the power conversion apparatus 100 according to the first embodiment illustrated in FIG. 1, but has a short circuit 17 provided between the reactor 5 and the rectifier circuit 6. The short circuit 17 includes a short-circuiting switching element 16 and a diode bridge 15 connected in parallel with the short-circuiting switching element 16. Depending on an on operation of the short-circuiting switching element 16, the short circuit 17 performs a power supply short-circuiting operation that short-circuits the power supply voltage Vs applied via the reactor 5. In FIG. 12, the gate circuit unit 14 has been replace by a gate circuit unit 14B. In addition to the gate signals Q1, Q2, Q3, and Q4, the gate circuit unit 14B generates and outputs a gate signal Q5 for driving the short-circuiting switching element 16. The configuration in other respects is equal or equivalent to the configuration of the first embodiment. Constituent elements identical or equivalent to those in the first embodiment are given the same reference characters and their redundant description is omitted.

Figure 13:
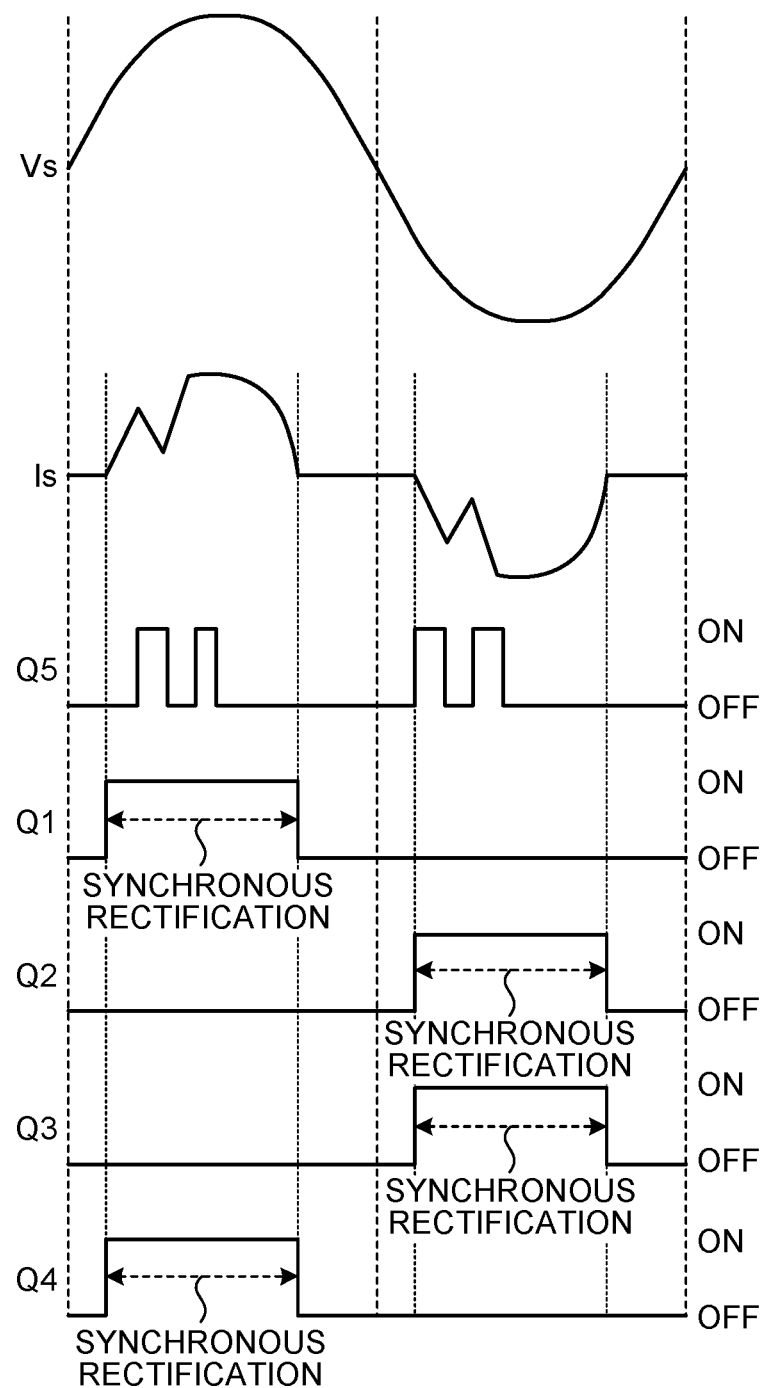
FIG. 13 is a chart illustrating a switching pattern pertaining to basic operations of the rectifier circuit and a short circuit in the second embodiment.

FIG. 13 is a chart illustrating a switching pattern pertaining to a basic operation of the rectifier circuit 6 and the short circuit 17 in the second embodiment. A horizontal axis in FIG. 13 represents time. FIG. 13 illustrates, from its top toward the bottom along a vertical axis, operating waveforms of the power supply voltage Vs, the primary current Is, the gate signal Q5, the gate signal Q1, the gate signal Q2, the gate signal Q3, and the gate signal Q4.

In FIG. 13, when the power supply voltage Vs is of positive polarity, each of the switching elements 1 and 4 is controlled to be on throughout a period in which the current flows through the parallel-connected diode. When the power supply voltage Vs is of negative polarity, each of the switching elements 2 and 3 is controlled to be on throughout a period in which the current flows through the parallel-connected diode. These operations both refer to the above-stated synchronous rectification.

When the direct-current voltage Vdc needs to be boosted, the gate signal Q5 is controlled to be ON, thereby causing the short-circuiting switching element 16 to conduct as illustrated in FIG. 13. This is when the electric current flows in the short circuit 17 along a path through the alternating-current power supply 50, the reactor 5, the diode bridge 15, the short-circuiting switching element 16, the diode bridge 15, and the alternating-current power supply 50. Accordingly, energy is stored in the reactor 5. When the short-circuiting switching element 16 becomes non-conducting thereafter, the energy stored in the reactor 5 is released into the smoothing capacitor 7 via the rectifier circuit 6. Accordingly, the direct-current voltage Vdc that is a voltage across the smoothing capacitor 7, is boosted.

In FIG. 13, there is shown an example in which the power supply short-circuiting is performed twice in each half cycle of the power supply voltage Vs, but the present disclosure is not necessarily limited to this example. The power supply short-circuiting may be performed only once or between three times and several times, inclusive.

A description is provided next of an operation of the principal part in the power conversion apparatus 100B according to the second embodiment. Before the description of the operation of the principal part, a description is provided of a path of the current flowing in the rectifier circuit 6 or the short circuit 17 of the second embodiment.

Figure 14:
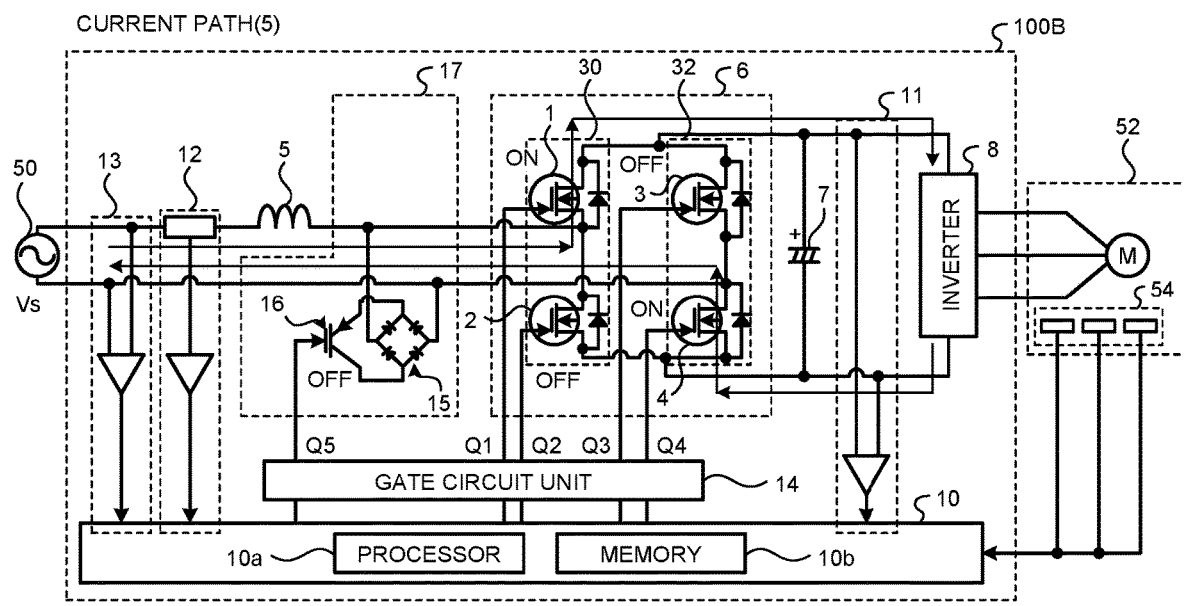
FIG. 14 is a diagram illustrating a fifth path of an electric current that flows into the rectifier circuit or the short circuit of the second embodiment.

FIG. 14 is a diagram illustrating a fifth path of the current that flows in the rectifier circuit 6 or the short circuit 17 of the second embodiment. The current path illustrated in FIG.

14 is defined as a "current path (5)". In FIG. 14, there is shown an electric current path formed by the synchronous rectification when the power supply voltage Vs is of positive polarity. The switching elements 1 and 4 are in the ON state, the switching elements 2 and 3 are in an OFF state, and the short-circuiting switching element 16 is in the OFF state. In this state, the current flows along the path through the alternating-current power supply 50, the reactor 5, the switching element 1, the inverter 8, the switching element 4, and the alternating-current power supply 50.

Figure 15:
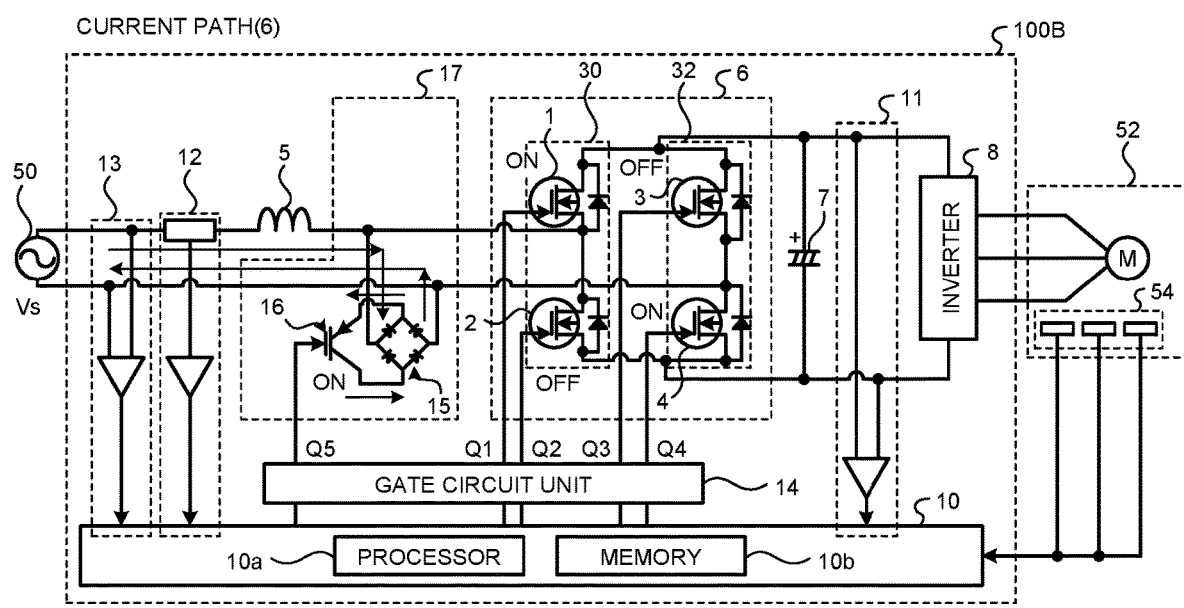
FIG. 15 is a diagram illustrating a sixth path of an electric current that flows into the rectifier circuit or the short circuit of the second embodiment.

FIG. 15 is a diagram illustrating a sixth path of an electric current that flows in the rectifier circuit 6 or the short circuit 17 of the second embodiment. The electric current path illustrated in FIG. 15 is defined as a "current path (6)". In FIG. 15, there is shown an electric current path formed by the power supply short-circuiting when the power supply voltage Vs is of positive polarity. The switching elements 1 and 4 are in the ON state, the switching elements 2 and 3 are in the OFF state, and the short-circuiting switching element 16 is in the ON state. In this state, the electric current flows along the path through the alternating-current power supply 50, the reactor 5, the diode bridge 15, the short-circuiting switching element 16, the diode bridge 15, and the alternating-current power supply 50.

Figure 16:
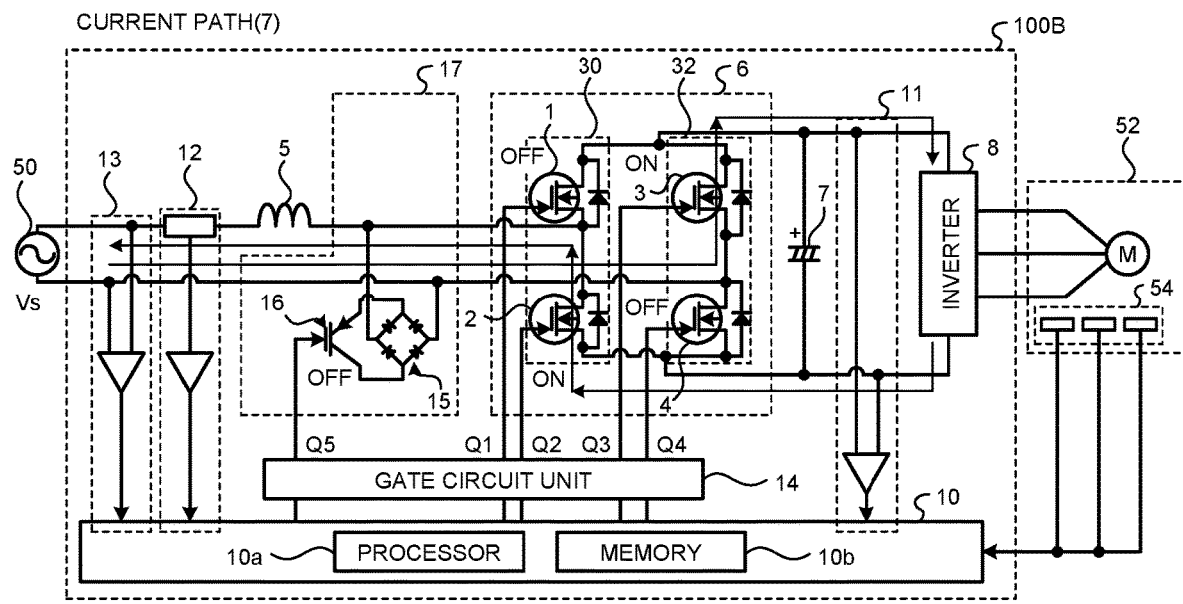
FIG. 16 is a diagram illustrating a seventh path of an electric current that flows into the rectifier circuit or the short circuit of the second embodiment.

FIG. 16 is a diagram illustrating a seventh path of an electric current that flows in the rectifier circuit 6 or the short circuit 17 according to the second embodiment. The current path illustrated in FIG. 16 is defined as a "current path (7)". In FIG. 16, there is shown an electric current path formed by the synchronous rectification when the power supply voltage Vs is of negative polarity. The switching elements 2 and 3 are in the ON state, the switching elements 1 and 4 are in the OFF state, and the short-circuiting switching element 16 is in the OFF state. In this state, the electric current flows along the path through the alternating-current power supply 50, the switching element 3, the inverter 8, the switching element 2, the reactor 5, and the alternating-current power supply 50.

Figure 17:
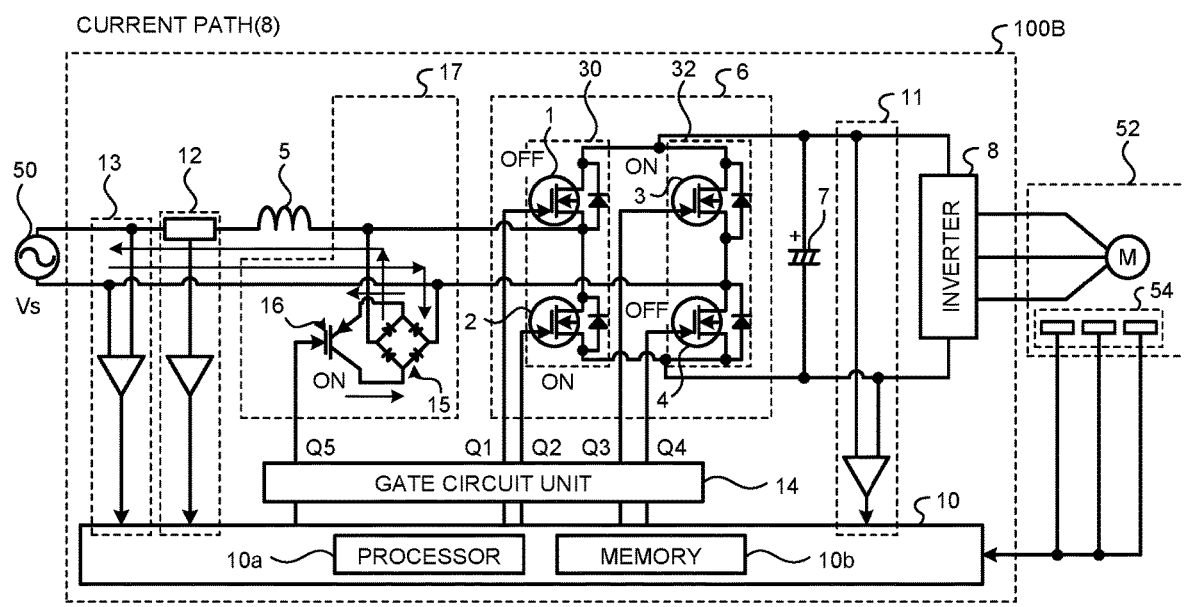
FIG. 17 is a diagram illustrating an eighth path of an electric current that flows into the rectifier circuit or the short circuit of the second embodiment.

FIG. 17 is a diagram illustrating an eighth path of an electric current that flows in the rectifier circuit 6 or the short circuit 17 of the second embodiment. The electric current path illustrated in FIG. 17 is defined as a "current path (8)". In FIG. 17, there is shown an electric current path formed by the power supply short-circuiting when the power supply voltage Vs is of negative polarity. The switching elements 2 and 3 are in the ON state, the switching elements 1 and 4 are in the OFF state, and the short-circuiting switching element 16 is in the ON state. In this state, the current flows along the path through the alternating-current power supply 50, the diode bridge 15, the short-circuiting switching element 16, the diode bridge 15, the reactor 5, and the alternating-current power supply 50.

Figure 18:
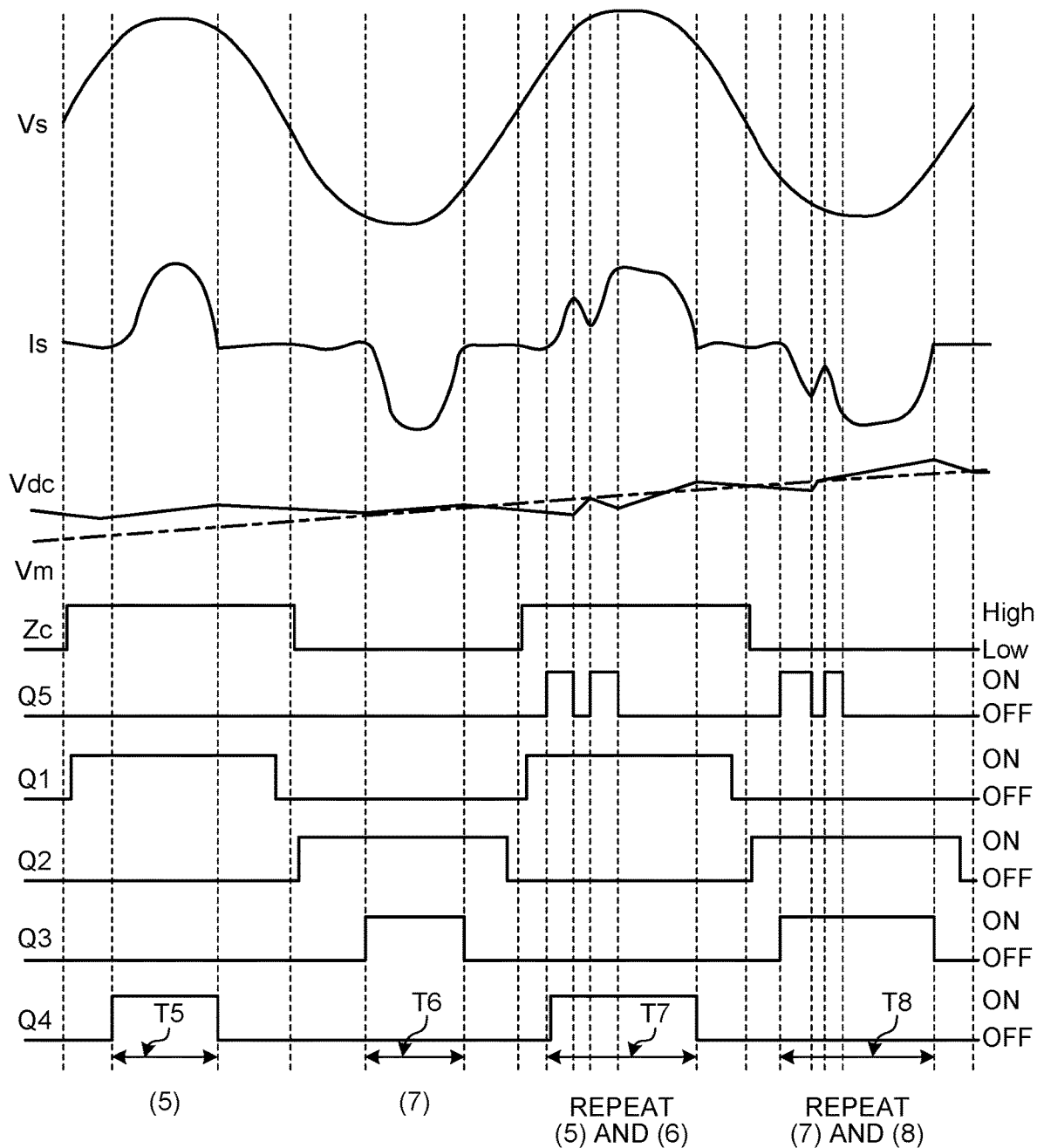
FIG. 18 is a time chart that is used for explaining an operation of the principal part in the second embodiment.

FIG. 18 is a time chart that is used for explaining the operation of the principal part in the second embodiment. FIG. 18 illustrates operating waveforms in the principal part that operates according to the flowchart of FIG. 9. Specifically, FIG. 18 illustrates, from its top toward the bottom, operating waveforms of the power supply voltage Vs, the primary current Is, the direct-current voltage Vdc, the induced voltage Vm, the zero cross signal Zc, the gate signal Q5, the gate signal Q1, the gate signal Q2, the gate signal Q3, and the gate signal Q4. A horizontal axis represents time. As to the direct-current voltage Vdc and the induced voltage Vm, the direct-current voltage Vdc is represented by a solid line, and the induced voltage Vm is represented by a dot-and-dash line.

The operating waveforms of FIG. 18 show here that the direct-current voltage Vdc is greater than the induced voltage Vm in a period T5 during which the gate signal Q4 is on. Therefore, no boosting is performed, and the current flows along the current path (5), which is defined above.

The direct-current voltage Vdc is greater than the induced voltage Vm even in a period T6 during which the gate signal Q3 is on. Therefore, no boosting is performed, and the current flows along the current path (7), which is defined above.

On the other hand, in the next cycle of the power supply voltage Vs, there is a period in which the induced voltage Vm becomes greater than the direct-current voltage Vdc. Therefore, in a period T7 during which the gate signal Q4 is on, the operation in which the current flows along the current path (5) and the operation in which the current flows along the current path (6) are repeated. Moreover, also in a period T8 during which the gate signal Q3 is on, the operation in which the current flows along the current path (7) and the operation in which the current flows along the current path (8) are repeated. In other words, the synchronous rectification and the boosting operation are repeated in the periods T7 and T8.

In the periods T7 and T8, switching is performed between the synchronous rectification and the boosting without changing switching operations of the gate signals Q1, Q2, Q3, and Q4 that are involved in the synchronous rectification. In other words, in the periods T7 and T8, it is possible to switch between the synchronous rectification and the boosting operation without interposing a suspension period in the switching operation between the synchronous rectification and the boosting.

When the motor 52 has a higher rotational speed, the induced voltage Vm of the motor 52 is larger. Therefore, under the same load condition, the motor current, that is to say, an electric current flowing in the motor 52 increases, and the motor 52 has increased loss. By contrast, in the control of the second embodiment, the switching is performed from the synchronous rectification to the boosting to boost the direct-current voltage Vdc when the induced voltage Vm of the motor 52 is greater than the direct-current voltage Vdc. By so doing, the motor current can be restrained from increasing. In this way, a further efficiency improvement can be achieved in the higher speed rotation range of the motor 52.

In the control of the second embodiment, it is possible to switch between the synchronous rectification and the boosting seamlessly only through the control of the short-circuiting switching element 16 with no change of a switching pattern for the synchronous rectification in the rectifier circuit 6. By virtue thereof, the control for the boosting operation can be simplified compared with that of the first embodiment.

In the configuration according to the second embodiment, the circuit for the synchronous rectification and the circuit for the boosting are separately disposed. With this configuration, an advantage can be expected in that a heat quantity generated per switching element can be made smaller than that of the first embodiment.

Figure 19:
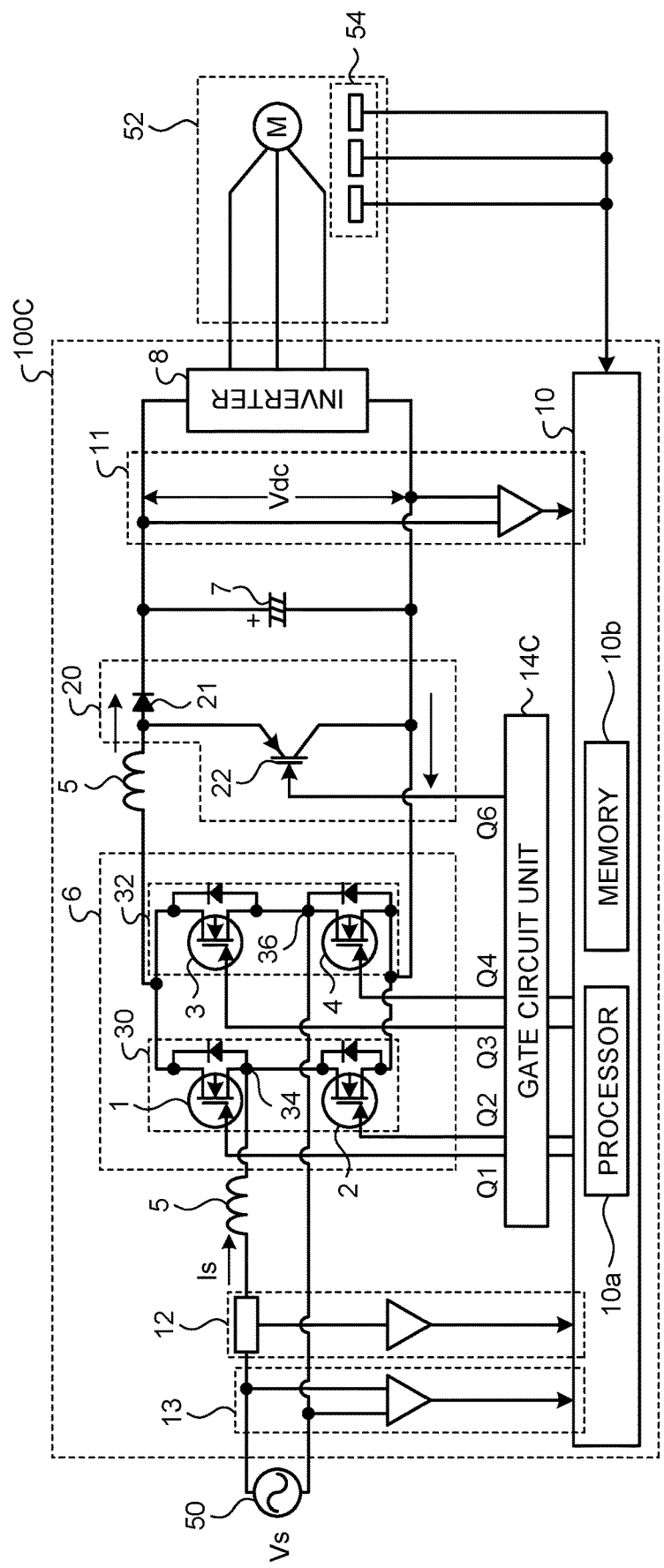
FIG. 19 is a diagram illustrating a configuration of a power conversion apparatus having a voltage boosting function, as a comparative example.

In the circuit configurations of the first and second embodiments, the reactor 5 is disposed on the input side of the rectifier circuit 6. Unlike these configurations, another configuration is also publicly known in which the reactor 5 is disposed on an output side of the rectifier circuit 6. FIG. 19 illustrates an example of that publicly known configuration. FIG. 19 is a diagram illustrating the configuration of a power conversion apparatus 100C having a voltage boosting function, as a comparative example.

The power conversion apparatus 100C according to the comparative example is based on the configuration of the power conversion apparatus 100 according to the first embodiment illustrated in FIG. 1 and has another reactor 5 disposed on the output side of the rectifier circuit 6 and a booster circuit 20 disposed between this reactor 5 and the smoothing capacitor 7. The booster circuit 20 includes a switching element 22 connected in parallel with the smoothing capacitor 7 and a diode 21 that is connected in an orientation for the diode to prevent electric charges stored in the smoothing capacitor 7 from flowing into the rectifier circuit 6. In FIG. 19, the gate circuit unit 14 is replaced by a gate circuit unit 14C. In addition to the gate signals Q1, Q2, Q3, and Q4, the gate circuit unit 14C generates and outputs a gate signal Q6 for driving the switching element 22.

Depending on an on-operation of the switching element 22, the booster circuit 20 short-circuits the output voltage of the rectifier circuit 6, applied via the reactor 5. By this short-circuiting, energy is stored in the reactor 5. Making the switching element 22 non-conducting thereafter releases the energy stored in the reactor 5 into the smoothing capacitor 7. Accordingly, the direct-current voltage Vdc, which is the voltage of the smoothing capacitor 7, is boosted.

In the configuration illustrated in FIG. 19, electric power supplied to the inverter 8 all passes through the diode 21. In contrast, each of the configurations of the first and second embodiments has no element corresponding to the diode 21. Therefore, each of the power conversion apparatuses 100, 100A, and 100B according to the first and second embodiments can make a loss caused by the semiconductor elements smaller than the power conversion apparatus 100C illustrated in FIG. 19.

As described above, the power conversion apparatus according to the second embodiment includes the reactor, the rectifier circuit to which the power supply voltage outputted by the alternating-current power supply is applied via the reactor, and the short circuit that is disposed between the reactor and the rectifier circuit and short-circuits the power supply voltage via the reactor on the basis of the on operation. The rectifier circuit includes the first leg and the second leg that is connected in parallel with the first leg. The first leg includes the first upper-arm element and the first lower-arm element that are connected in series, and the second leg includes the second upper-arm element and the second lower-arm element that are connected in series. The control unit performs the operation control of the short circuit on the basis of: the detected value of the direct-current voltage, which is obtained by detecting a direct-current voltage that has been smoothed by the smoothing capacitor used to smooth an output voltage of the rectifier circuit; and the induced voltage induced in the motor. In this way, the further efficiency improvement can be achieved in the motor's higher speed rotation range in which the induced voltage of the motor is higher. The first and second upper-arm elements and the first and second lower-arm elements are controlled to be on at the timing when the electric current flows through their respective parallel-connected diodes and to be off at the timing when the electric current does not flow through their respective diodes.

In the above-described control, the short circuit is controlled to be off when the induced voltage is smaller than the detected value of the direct-current voltage, and the short circuit is controlled to be on and off when the induced voltage is greater than the detected value of the direct-current voltage. According to the second embodiment, the switching between the synchronous rectification and the boosting can be realized only by the control on the short circuit. Consequently, the control that involves the boosting is simplified compared with that of the first embodiment.

Third Embodiment

Figure 20:
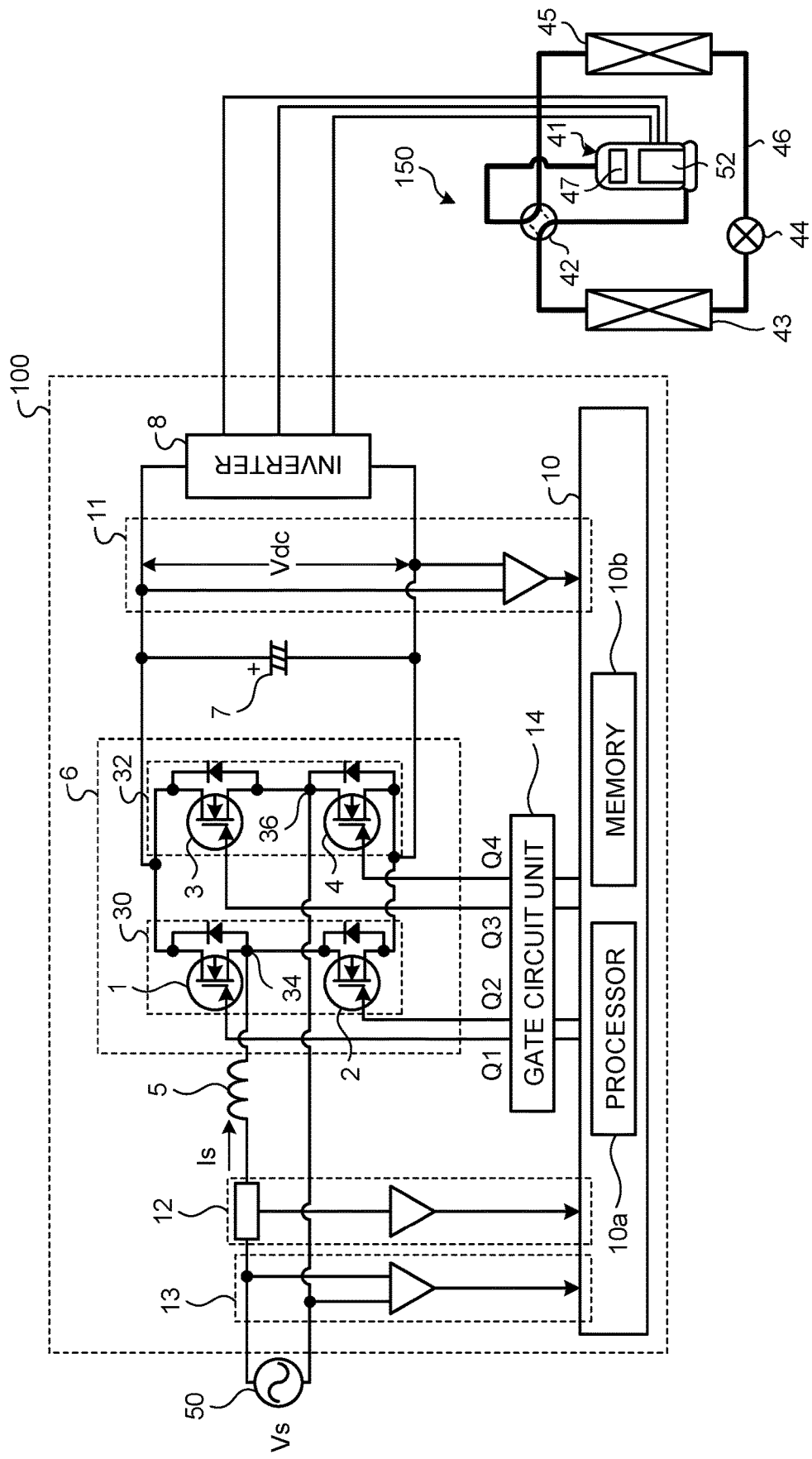
FIG. 20 is a diagram illustrating a configuration example of a refrigeration cycle apparatus according to a third embodiment.

FIG. 20 is a diagram illustrating a configuration example of a refrigeration cycle apparatus 200 according to the third embodiment. The refrigeration cycle apparatus 200 according to the third embodiment illustrated in FIG. 20 includes the power conversion apparatus 100 described in the first embodiment. The refrigeration cycle apparatus 200 is configured to include a refrigeration cycle 150 in which a compressor 41 having the motor 52, a four-way valve 42, an outdoor heat exchanger 43, an expansion valve 44, and an indoor heat exchanger 45 are incorporated via refrigerant pipes 46. The motor 52 is driven by the inverter 8. The refrigeration cycle apparatus 200 may be configured to include the power conversion apparatus 100A described in the first embodiment or the power conversion apparatus 100B described in the second embodiment.

The compressor 41 internally includes a compression mechanism 47 that compresses a refrigerant and the motor 52 that drives the compression mechanism 47. Therefore, the refrigerant from the compressor 41 circulates between the outdoor heat exchanger 43 and the indoor heat exchanger 45 thereby to form the refrigeration cycle 150 for performing heating, cooling of the like. The refrigeration cycle 150 illustrated in FIG. 20 is applicable, for example, to an air conditioner.

The refrigeration cycle apparatus 200 according to the third embodiment includes the power conversion apparatus 100 described in the first embodiment. As described above, the power conversion apparatus 100 according to the first embodiment can achieve the further efficiency improvement in the higher speed rotation range of the motor. Therefore, when applied, for example, to the air conditioners, the refrigeration cycle apparatus 200 according to the third embodiment yields an advantageous effect of making it possible to enhance efficiency for the resultant applied products as compared to a conventional one.

The above configurations described in the embodiments are just illustrative, each of which can be combined with other publicly known techniques and combined with the other, and also can be partly omitted and/or modified without departing from the scope of the disclosure.

The invention claimed is:

1. A power conversion apparatus comprising:
a reactor;
a rectifier circuit to receive a power supply voltage outputted by an alternating-current power supply, the rectifier circuit including a first leg and a second leg connected in parallel with the first leg, the first leg including a first upper-arm element and a first lower-arm element that are connected in series, the second leg including a second upper-arm element and a second lower-arm element that are connected in series, the power supply voltage being applied, via the reactor, between a connection point between the first upper-arm element and the first lower-arm element and a connection point between the second upper-arm element and the second lower-arm element;
a smoothing capacitor to smooth an output voltage of the rectifier circuit;
an inverter to convert a direct-current voltage smoothed by the smoothing capacitor into a drive voltage for a motor and apply the drive voltage to the motor;

a first voltage detection unit to detect the direct-current voltage;

a current detection unit to detect a primary current that flows in an input side of the rectifier circuit;

a second voltage detection unit to detect the power supply voltage; and a control unit to control operation of the rectifier circuit and the inverter, wherein the control unit controls operations of the first upper-arm element and the first lower-arm element on the basis of an induced voltage induced in the motor and a detected value of the direct-current voltage, each of the second upper-arm element and the second lower-arm element is controlled to be on at a timing when an electric current flows in its respective diode parallel-connected to the element and to be off at a timing when a current does not flow in the diode, when the induced voltage is smaller than a detected value of the direct-current voltage, the first upper-arm element and the first lower-arm element are controlled to be on and off alternately every half cycle of the power supply voltage, and when the induced voltage is greater than a detected value of the direct-current voltage, the first upper-arm element and the first lower-arm element are controlled to be on and off alternately within a half cycle with the same polarity without depending on what a polarity of the power supply voltage is.

2. The power conversion apparatus according to claim 1, wherein the upper-arm and lower-arm elements of the first and second legs are made with a wide-bandgap semiconductor.

3. The power conversion apparatus according to claim 2, wherein the wide-bandgap semiconductor is one of silicon carbide, gallium nitride, gallium oxide, and diamond.

4. A refrigeration cycle apparatus comprising:

the power conversion apparatus according to claim 1; and a compressor including the motor.

5. An air conditioner comprising the refrigeration cycle apparatus according to claim 4.

6. A power conversion apparatus comprising:

a reactor;

a rectifier circuit to receive a power supply voltage outputted by an alternating-current power supply, the rectifier circuit including a first leg and a second leg connected in parallel with the first leg, the first leg including a first upper-arm element and a first lower-arm element that are connected in series, the second leg including a second upper-arm element and a second lower-arm element that are connected in series, the power supply voltage being applied, via the reactor, between a connection point between the first upper-arm element and the first lower-arm element and a connection point between the second upper-arm element and the second lower-arm element;

a short circuit disposed between the reactor and the rectifier circuit to short-circuit the power supply voltage via the reactor depending on an on operation;

a smoothing capacitor to smooth an output voltage of the rectifier circuit;

an inverter to convert a direct-current voltage smoothed by the smoothing capacitor into a drive voltage for a motor and apply the drive voltage to the motor;

a first voltage detection unit to detect the direct-current voltage; and a control unit to control operation of the rectifier circuit, the inverter, and the short circuit, wherein the control unit controls an operation of the short circuit on the basis of an induced voltage induced in the motor and a detected value of the direct-current voltage.

7. The power conversion apparatus according to claim 6, wherein each of the first and second upper-arm elements and the first and second lower-arm elements is controlled to be on at a timing when a current flows in its respective diode parallel-connected to the element and to be off at a timing when a current does not flow in the diode.

8. The power conversion apparatus according to claim 7, comprising:

a current detection unit to detect a primary current that flows in an input side of the rectifier circuit; and a second voltage detection unit to detect the power supply voltage, wherein when the induced voltage is smaller than a detected value of the direct-current voltage, the short circuit is controlled to be off, and when the induced voltage is greater than a detected value of the direct-current voltage, the short circuit is controlled to be on and off alternately.

9. The power conversion apparatus according to claim 6, wherein the upper-arm and lower-arm elements of the first and second legs are made with a wide-bandgap semiconductor.

10. The power conversion apparatus according to claim 9, wherein the wide-bandgap semiconductor is one of silicon carbide, gallium nitride, gallium oxide, and diamond.

11. A refrigeration cycle apparatus comprising:

the power conversion apparatus according to claim 6; and a compressor including the motor.

12. An air conditioner comprising the refrigeration cycle apparatus according to claim 11.

* * * * *